US009909898B2

United States Patent
Konishi et al.

(10) Patent No.: US 9,909,898 B2
(45) Date of Patent: Mar. 6, 2018

(54) IN-VEHICLE DEVICE, INFORMATION DISTRIBUTION SERVER, AND FACILITY INFORMATION DISPLAY METHOD

(71) Applicant: MITSUBISHI ELECTRIC CORPORATION, Tokyo (JP)

(72) Inventors: Yasutaka Konishi, Tokyo (JP); Kiyoshi Matsutani, Tokyo (JP); Shinji Akatsu, Tokyo (JP); Atsushi Matsumoto, Tokyo (JP); Takuji Morimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 49 days.

(21) Appl. No.: 14/762,788

(22) PCT Filed: Apr. 26, 2013

(86) PCT No.: PCT/JP2013/062447
§ 371 (c)(1),
(2) Date: Jul. 22, 2015

(87) PCT Pub. No.: WO2014/174677
PCT Pub. Date: Oct. 30, 2014

(65) Prior Publication Data
US 2016/0033297 A1 Feb. 4, 2016

(51) Int. Cl.
*G01C 21/36* (2006.01)
*G06F 17/30* (2006.01)
(Continued)

(52) U.S. Cl.
CPC ..... *G01C 21/3679* (2013.01); *G01C 21/3682* (2013.01); *G01C 21/3685* (2013.01);
(Continued)

(58) Field of Classification Search
CPC ............ G01C 21/3685; G01C 21/3682; G01C 21/3679; G06Q 50/30; G06Q 30/00;
(Continued)

(56) References Cited

U.S. PATENT DOCUMENTS 8,841,994 B2 * 9/2014 Li ......................... B60K 28/02
180/271
2009/0037101 A1 * 2/2009 Koike ................ G01C 21/3664
701/533
(Continued)

FOREIGN PATENT DOCUMENTS

JP 11-94576 A 4/1999
JP 2000-242892 A 9/2000
(Continued)

*Primary Examiner* — Nga X Nguyen
(74) *Attorney, Agent, or Firm* — Birch, Stewart, Kolasch & Birch, LLP

(57) ABSTRACT

An in-vehicle device 1 regularly transmits to an information distribution server 2 an acquisition request that includes an own vehicle position and a facility search condition, and acquires facility information matching the condition around the vehicle. The in-vehicle device 1 controls the number of displays of the facility information on the basis of the information in an in-vehicle sensor group 12 when displaying the acquired facility information on a map.

11 Claims, 27 Drawing Sheets

(51) Int. Cl.
*G06F 3/041* (2006.01)
*G06F 3/0484* (2013.01)
*G07C 5/00* (2006.01)
*G06F 3/01* (2006.01)
*G06Q 30/02* (2012.01)
*G06Q 50/30* (2012.01)

(52) U.S. Cl.
CPC .............. *G06F 3/017* (2013.01); *G06F 3/041* (2013.01); *G06F 3/0416* (2013.01); *G06F 3/0484* (2013.01); *G06F 3/04842* (2013.01); *G06F 17/3087* (2013.01); *G06Q 30/0241* (2013.01); *G06Q 30/0282* (2013.01); *G06Q 50/30* (2013.01); *G07C 5/006* (2013.01); *G07C 5/008* (2013.01)

(58) Field of Classification Search
CPC ........... G06Q 30/0241; G06Q 30/0282; G07C 5/006; G07C 5/008; G06F 17/3087; G06F 3/04842; G06F 3/0484; G06F 3/0416; G06F 3/041; G06F 3/017
USPC ............................................ 701/31.4, 28, 36
See application file for complete search history.

(56) References Cited

U.S. PATENT DOCUMENTS

| | | | |
|---|---|---|---|
| 2011/0040626 A1* | 2/2011 | Lin ................... | G01C 21/3682 705/14.63 |
| 2013/0107054 A1 | 5/2013 | Ueoka et al. | |
| 2014/0280076 A1* | 9/2014 | Sumizawa ......... | G01C 21/3679 707/722 |
| 2014/0302774 A1* | 10/2014 | Burke ................... | H04H 20/57 455/3.05 |

FOREIGN PATENT DOCUMENTS

| | | |
|---|---|---|
| JP | 2004-340824 A | 12/2004 |
| JP | 2006-193044 A | 7/2006 |
| JP | 2007-304976 A | 11/2007 |
| JP | 2008-58028 A | 3/2008 |
| JP | 2009-85963 A | 4/2009 |
| JP | 2010-271061 A | 12/2010 |
| JP | 2011-209263 A | 10/2011 |
| JP | 2012-14324 A | 1/2012 |
| JP | 2012-78305 A | 4/2012 |
| JP | 2013-72778 A | 4/2013 |

* cited by examiner

FIG. 17

IN-VEHICLE DEVICE, INFORMATION DISTRIBUTION SERVER, AND FACILITY INFORMATION DISPLAY METHOD

TECHNICAL FIELD

The present invention relates to an in-vehicle device that displays information on a facility around a vehicle, an information distribution server that distributes facility information, and a facility information display method of causing the in-vehicle device to display the facility information distributed by an information distribution server.

BACKGROUND ART

Hitherto, there has been proposed a navigation system that acquires fresh facility information from an information distribution server at an arbitrary timing, and that uses the facility information in a navigation apparatus in a mobile body (e.g. a vehicle). In the navigation system, a search is made for facility information that meets a desire of a user on the basis of position information on an own vehicle or a destination and a search condition by an user's input. Further, in order to reduce a burden on the user and search the facility information that meets the desire even during travel, the navigation system adopts means for estimating a user's situation inside the system and reflecting the resultant in the search condition.

In order to be able to guide a facility that meets various requests of a user on board during travel, a navigation apparatus according to Patent Document 1, for example, can receive an input of a plurality of search conditions, and searches for the facility that is located in the direction of an exit lane and that satisfies the search conditions for each exit lane of a particular intersection that matches the conditions desired by the user. Then, the apparatus displays a destination guide indication that represents each facility searched for each exit lane of the particular intersection.

CITATION LIST

Patent Document

Patent Document 1: Japanese Patent Application Laid-open No. 2011-209263

SUMMARY OF THE INVENTION

Problems to be Solved by the Invention

In the navigation system described above, it is desirable to present, by a method that meets the desire of the user, a facility that meets the desire which varies depending on vehicle-exterior environments such as traveling place, time, season, and weather, and vehicle-interior environments such as gender of the user on board, and the number of people, and a driver's fatigue state.

The present invention has been made from the foregoing point of view, and an object thereof is to minimize time and labor for a setting by the user by controlling the search and display of the facility information in accordance with the desire of the user which varies depending on the vehicle-exterior environments and vehicle-interior environments.

Means for Solving the Problems

An in-vehicle device of the present invention includes: a vehicle information acquirer that acquires information on at least one of a speed of a vehicle and presence or absence of an obstacle around the vehicle in addition to a position of the vehicle; a search condition storage that stores a facility search condition input by a user; a search condition setter that acquires the facility search condition from the search condition storage each time an acquisition request for facility information is sent to an information distribution server that holds the facility information; a facility information acquirer that regularly transmits, to the information distribution server, the acquisition request combined with the position of the vehicle acquired by the vehicle information acquirer and the facility search condition acquired by the search condition setter, and that receives, from the information distribution server, the facility information on the facility located around the vehicle and matching the facility search condition; and a facility information display controller that controls the number of displays of the facility information on the basis of the information in the vehicle information acquirer when the facility information acquired by the facility information acquirer is displayed on a map.

An information distribution server of the invention includes: a facility information database that stores facility information; a facility information searcher that extracts, on the basis of a position of a vehicle on which the in-vehicle device is mounted and a facility search condition, the facility information on the facility located around the vehicle and matching the facility search condition from the facility information database; a facility information generation processor that converts the facility information extracted by the facility information searcher into a data format for display by the in-vehicle device, and that controls the number of displays of the facility information on the basis of vehicle information that includes at least one of a speed of the vehicle and presence or absence of an obstacle around the vehicle in addition to the position of the vehicle; and a facility information transmitter that receives an acquisition request that includes the vehicle information and the facility search condition from the in-vehicle device, and that returns the facility information in the data format generated by the facility information generation processor.

An facility information display method of the invention includes: a vehicle information acquisition step in which a vehicle information acquirer acquires information on at least one of a speed of a vehicle and presence or absence of an obstacle around the vehicle in addition to a position of the vehicle; a search condition setting step in which a search condition setter acquires, from a search condition storage that stores a facility search condition input by a user, the facility search condition each time an acquisition request for facility information is sent to an information distribution server that holds the facility information; a facility information acquisition step in which a facility information acquirer regularly transmits, to the information distribution server, the acquisition request combined with the position of the vehicle acquired in the vehicle information acquisition step and the facility search condition acquired in the search condition setting step, and receives, from the information distribution server, the facility information on the facility located around the vehicle and matching the facility search condition; and a facility information display step in which a facility information display controller controls the number of displays of the facility information acquired in the facility information acquisition step on the basis of the information acquired in the vehicle information acquisition step, and displays the facility information on a map of the display.

Effect of the Invention

According to the present invention, the acquisition request for the facility information is regularly made, which makes it possible to search and display the latest information on the facility that suits the taste of the user during travel. Then, when the in-vehicle device or the information distribution server controls the number of displays of the facility information using the information in the vehicle information acquirer, the display of the facility information in accordance with a traveling place can be carried out safely such that the display of the facility information is restricted, for example, when the vehicle is traveling on a road with poor visibility, to thereby minimize time and labor for a setting by the user.

BRIEF DESCRIPTION OF THE DRAWINGS

FIG. 17 is a block diagram illustrating a configuration of a navigation system according to Embodiment 4 of the present invention.

MODES FOR CARRYING OUT THE INVENTION

In order to describe the present invention in more detail, embodiments of the present invention will be described below with reference to the accompanying drawings.
Embodiment 1

Figure 1:
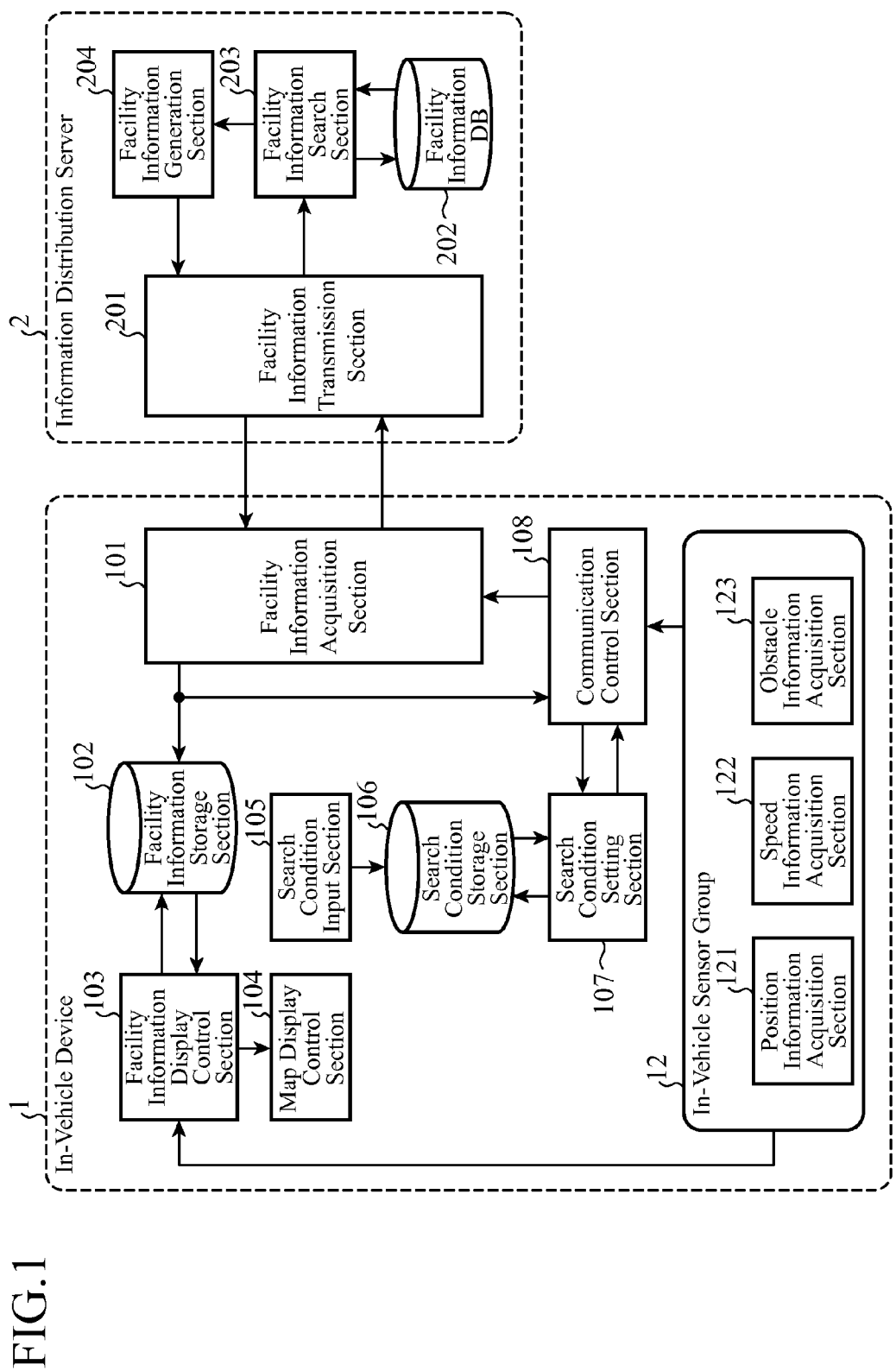
FIG. 1 is a block diagram illustrating a configuration of a navigation system according to Embodiment 1 of the present invention.

A navigation system illustrated in FIG. 1 is composed of an in-vehicle device 1 mounted on a vehicle, and an information distribution server 2 installed outside the vehicle. The in-vehicle device 1 and the information distribution server 2 can wirelessly communicate with each other.

The information distribution server 2 is assumed to be a server system on the Web. The information distribution server 2 includes a facility information transmission section 201, a facility information database (hereinafter, DB) 202, a facility information search section 203, and a facility information generation section 204.

The facility information transmission section 201 receives a facility search condition sent from the in-vehicle device 1 to notify the facility information search section 203 of the condition, and acquires the facility information that matches that facility search condition through the facility information generation section 204 to transmit the information to the in-vehicle device 1.

The facility information DB 202 stores the facility name, position, facility genre (e.g. genre of cuisine for a restaurant), business hours, advertisement information (e.g. coupon), word-of-mouth information, and so forth for each facility as the facility information in each region.

The facility information search section 203 searches, on the basis of the facility search condition received by the facility information transmission section 201, the facility information DB 202 for the facility that matches the facility search condition. The facility search condition and the search method will be discussed in detail later.

The facility information generation section 204 converts the facility information acquired by the facility information search section 203 from the facility information DB 202 into a data format such as XML (eXtensible Markup Language), HTML (HyperText Markup Language), and JSON (JavaScript Object Notation) (JavaScript is a registered trademark). The converted information is transmitted from the facility information transmission section 201 to the in-vehicle device 1.

The in-vehicle device 1 is assumed to be a car navigation apparatus that has a function capable of communicating with the information distribution server 2, that can acquire vehicle information such as position information and speed information, and that has a touch panel display, for example. Note that in FIG. 1, an illustration of the (touch panel) display equipped in the in-vehicle device 1 is omitted.

The in-vehicle device 1 includes a facility information acquisition section 101, a facility information storage section 102, a facility information display control section 103, a map display control section 104, a search condition input section 105, a search condition storage section 106, a search condition setting section 107, a communication control section 108, and an in-vehicle sensor group (vehicle information acquisition section) 12.

The in-vehicle sensor group 12 includes a position information acquisition section 121, a speed information acquisition section 122, and an obstacle information acquisition section 123. The position information acquisition section 121 acquires position information from a sensor that can measure the three-dimensional position of an own vehicle such as a GPS (Global Positioning System) and a gyro sensor. The speed information acquisition section 122 acquires speed information from the sensor that can measure the speed of the vehicle such as a vehicle speed sensor and an acceleration sensor. The obstacle information acquisition section 123 acquires obstacle information that indicates the presence or absence of an obstacle from a sensor that senses an obstacle around the vehicle such as an ultrasonic sensor, a millimeter wave radar, and an in-vehicle camera.

Additionally, the position information acquisition section 121, the speed information acquisition section 122, and the obstacle information acquisition section 123 may include a group of sensors of the above, or may be an interface that acquires the information from the group of sensors mounted on the vehicle.

The facility information acquisition section 101 performs HTTP (HyperText Transfer Protocol) communication with the information distribution server 2 through a mobile communication line, transmits a facility search condition, and acquires the facility information searched by the information distribution server 2 using that condition. Although discussed in detail later, the acquisition timing of the facility information is controlled by the communication control section 108, and the facility search condition is set by the search condition setting section 107.

The facility information storage section 102 includes a volatile memory, and temporarily stores the current facility information acquired by the facility information acquisition section 101 from the information distribution server 2 in the volatile memory until the next acquisition.

The facility information display control section 103 generates a user interface (hereinafter, facility information UI) for displaying superimposedly the facility information stored in the facility information storage section 102 on a map screen. The above UI indicates the UI as a whole that includes not only a marker that indicates the position of the facility displayed on the map screen but also a screen that displays detailed information on the facility. In addition, the facility information display control section 103 controls the number of displays of the facility information UIs according to a traveling place judged from the information in the in-vehicle sensor group 12. For example, in the case where it is judged that an obstacle is located around the vehicle and the vehicle is traveling on a road with poor visibility on the basis of the obstacle information acquired by the obstacle information acquisition section 123, or in the case where it is judged that the travel speed of the vehicle is equal to or more than a predetermined speed on the basis of the speed information acquired by the speed information acquisition section 122, the facility information display control section 103 performs control so as not to display the facility information UI on the map screen or performs control so as to restrict the number of display cases of the facility information UIs to a predetermined number so that the user (in particular, the driver) is not likely to pay attention to the display screen. In addition, for example, the facility information display control section 103 restricts the number of displays of the facility information UIs on the map screen so that the driver is not distracted by other information in the case where it is judged that the vehicle is near the destination on the basis of the position information acquired by the position information acquisition section 121, and restricts the number of displays of the facility information UIs in the case where it is judged that the vehicle is traveling on a narrow road, through an intersection with poor visibility, or through a complicated route because the behavior of momentary inattentiveness and distraction may lead to an accident.

Incidentally, in the above description, there is described an example in which the number of displays of the facility information UIs is controlled on the basis of the information in the in-vehicle sensor group 12, but it is not limited thereto; the number of audio guides may be restricted in the case where the audio guide on the facility information is provided.

The map display control section 104 displays the map screen on the display of the in-vehicle device 1, and displays superimposedly the facility information UI generated by the facility information display control section 103 on the map screen. Note that map information that serves as the source of the map screen may be held by the in-vehicle device 1, or may be acquired from an external information source such as the information distribution server 2.

The search condition input section 105 receives, from the user, a facility search condition for searching the facility information possessed by the information distribution server 2.

Figure 2:
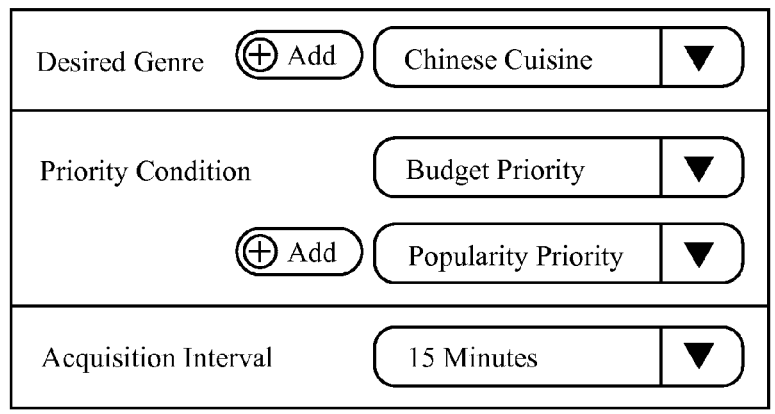
FIG. 2 illustrates an example of an input screen for a facility search condition in an in-vehicle device according to Embodiment 1.

Here, an example of the input screen for the facility search condition to be displayed on the display of the in-vehicle device 1 by the search condition input section 105 is illustrated in FIG. 2. In the example of FIG. 2, it is possible to select a "desired genre" such as Chinese cuisine, a "priority condition" to be given priority during search such as budget and popularity, and an "acquisition interval" at which the search result is acquired in the case where the user searches for the restaurant. It is also possible to add the search condition thereto by selecting an "add" button. Note that the search condition input section 105 judges no search condition in the case where the user makes no input.

The search condition storage section 106 includes a volatile memory. The facility search condition received by the search condition input section 105 is stored in the volatile memory.

The search condition setting section 107 reads the facility search condition from the search condition storage section 106 to notify the communication control section 108 of the read facility search condition each time an acquisition request for the facility information is sent from the facility information acquisition section 101 to the information distribution server 2.

According to the acquisition interval included in the facility search condition output from the search condition setting section 107, for each acquisition interval thereof, the communication control section 108 acquires the latest facility search condition from the search condition setting section 107 and acquires the current position information from the position information acquisition section 121 to notify the facility information acquisition section 101 of the condition and information, and it is transmitted from the facility information acquisition section 101 to the information distribution server 2 as the acquisition request for the facility information. For example, in the case where the user sets the "acquisition interval" to 15 minutes on the input screen of FIG. 2, the communication control section 108 controls the acquisition timing of the facility information acquisition section 101 at an interval of 15 minutes.

The communication control section 108 basically controls the facility information acquisition section 101 so as to acquire facility information at the constant acquisition interval set by the user, and changes the acquisition interval on the basis of the information in the in-vehicle sensor group 12 and the last facility information acquisition result. For example, in the case where it is judged that the vehicle is traveling on an expressway by collating the position information acquired by the position information acquisition section 121 with the map information possessed by the in-vehicle device 1, and when no exit or rest facility (e.g. a parking area) is located around the vehicle, the communication control section 108 makes the acquisition interval for the facility information longer. This is because it is highly likely that no facility is located around the expressway and thus it is highly likely that the facility information that matches the facility search condition is not acquired. The communication control section 108 also makes the acquisition interval longer when the facility information was not acquired from the information distribution server 2 (that is, when the facility information that matches the facility search condition was not found) at the last timing of the acquisition of the facility information.

In addition, the communication control section 108 may be configured to receive the input from a hardware button of the in-vehicle device 1, a button displayed on the display, or the like so that the communication control section 108 controls the facility information acquisition section 101 so as to acquire the facility information at the timing when the above buttons are operated by the user.

However, it should be noted that the following description is made on the premise that facility information is acquired at the constant acquisition interval unless otherwise noted.

Additionally, although the illustration is omitted in FIG. 1, the in-vehicle device 1 has a navigation function, and can search for a route from the current position to the destination facility and provide guidance on the basis of the facility (destination) selected by an input operation by the user, the current position information, and the map information.

Alternatively, the information distribution server 2 may have the navigation function. In this case, the facility (destination) selected by the input operation by the user and the current position information are notified from the in-vehicle device 1 to the information distribution server 2. The information distribution server 2 searches for a route from the current position to the target facility on the basis of the notified information, and returns the information for guidance to the in-vehicle device 1. The in-vehicle device 1 displays (or audibly outputs) the information for guidance.

Next, an operation of the navigation system according to Embodiment 1 will be described.

Figure 3:
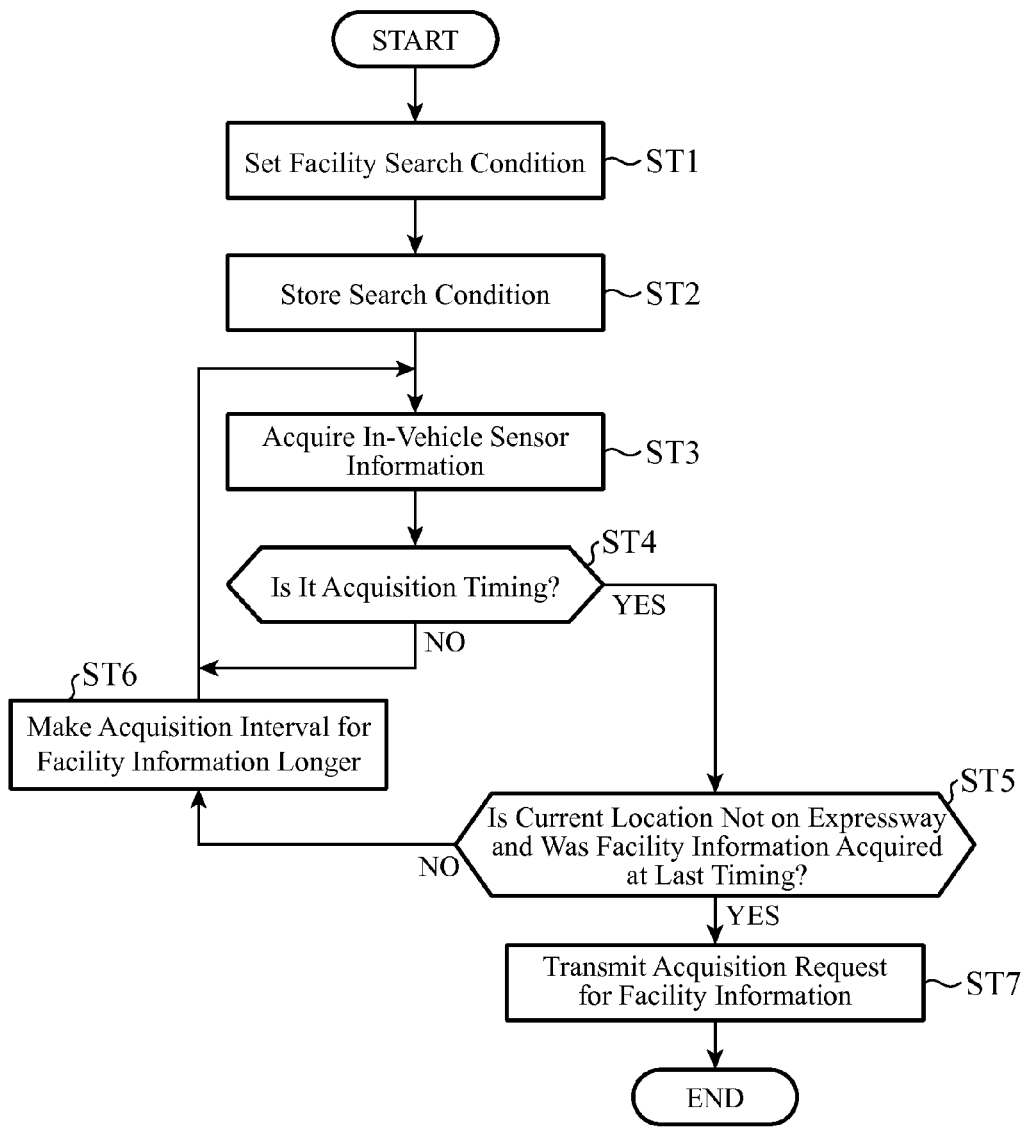
FIG. 3 is a flowchart illustrating an acquisition process for facility information performed by the in-vehicle device according to Embodiment 1.

FIG. 3 is a flowchart illustrating an acquisition process for the facility information by the in-vehicle device 1. First, the search condition input section 105 receives the input of the facility search condition (step ST1). The facility search condition is stored in the search condition storage section 106 (step ST2). The facility search condition stored in the search condition storage section 106 is notified from the search condition setting section 107 to the communication control section 108. In addition, the in-vehicle sensor group 12 acquires each sensor information, and notifies the communication control section 108 of the sensor information (step ST3).

Subsequently, the communication control section 108 judges in accordance with the acquisition interval (e.g. 15 minutes) included in the facility search condition whether or not it is the acquisition timing for the facility information (step ST4). If it is not the acquisition timing ("NO" in step ST4), the communication control section 108 stands by. If it is the acquisition timing ("YES" in step ST4), the communication control section 108 judges whether or not to acquire the facility information on the basis of each sensor information in the in-vehicle sensor group 12 and the last acquisition result of the facility information (step ST5). In the example of FIG. 3, as discussed above, in the case where the current location is not on the expressway and the facility information was acquired at the last timing ("YES" in step ST5), the communication control section 108 acquires the latest facility search condition from the search condition setting section 107, notifies the facility information acquisition section 101 of the condition together with the position information on the vehicle acquired in step ST3, and causes the facility information acquisition section 101 to transmit the resultant to the information distribution server 2 (step ST7).

On the other hand, in the case where the current location is on the expressway or the facility information was not acquired at the last timing ("NO" in step ST5), it is considered to be less likely that the facility information around the vehicle can be acquired even if the acquisition request is transmitted at the present timing. Thus, the communication control section 108 suspends the acquisition at the present timing, and sets the acquisition interval for the next acquisition longer, e.g. 30 minutes for only the next acquisition, which is twice the interval of 15 minutes (step ST6).

Figure 4:
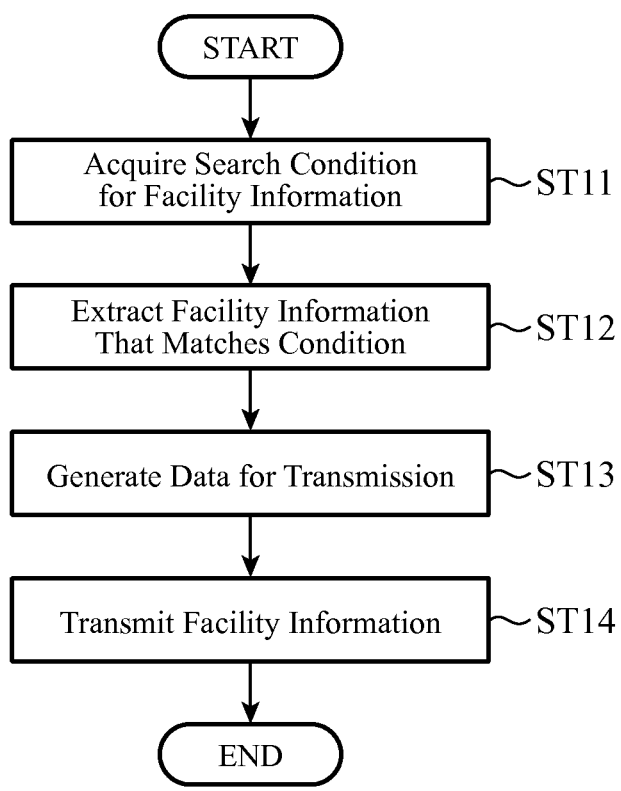
FIG. 4 is a flowchart illustrating a search and distribution process for facility information performed by an information distribution server according to Embodiment 1.

FIG. 4 is a flowchart illustrating a search and distribution process for the facility information performed by the information distribution server 2. Here, description is made on the assumption that the facility search condition has already been transmitted from the in-vehicle device 1.

First, the facility information transmission section 201 acquires the facility search condition transmitted by the in-vehicle device 1, and notifies the facility information search section 203 of the condition (step ST11). The facility information search section 203 extracts the facility information that matches the facility search condition from the facility information DB 202 (step ST12). The facility information generation section 204 converts that facility information into a data format for transmission (step ST13). The converted information is transmitted from the facility information transmission section 201 to the in-vehicle device 1 (step ST14).

Note that if no facility search condition is provided, the facility information search section 203 extracts the facility information around the vehicle on the basis of the position information on the vehicle on which the in-vehicle device 1 is mounted (step ST12).

Figure 5:
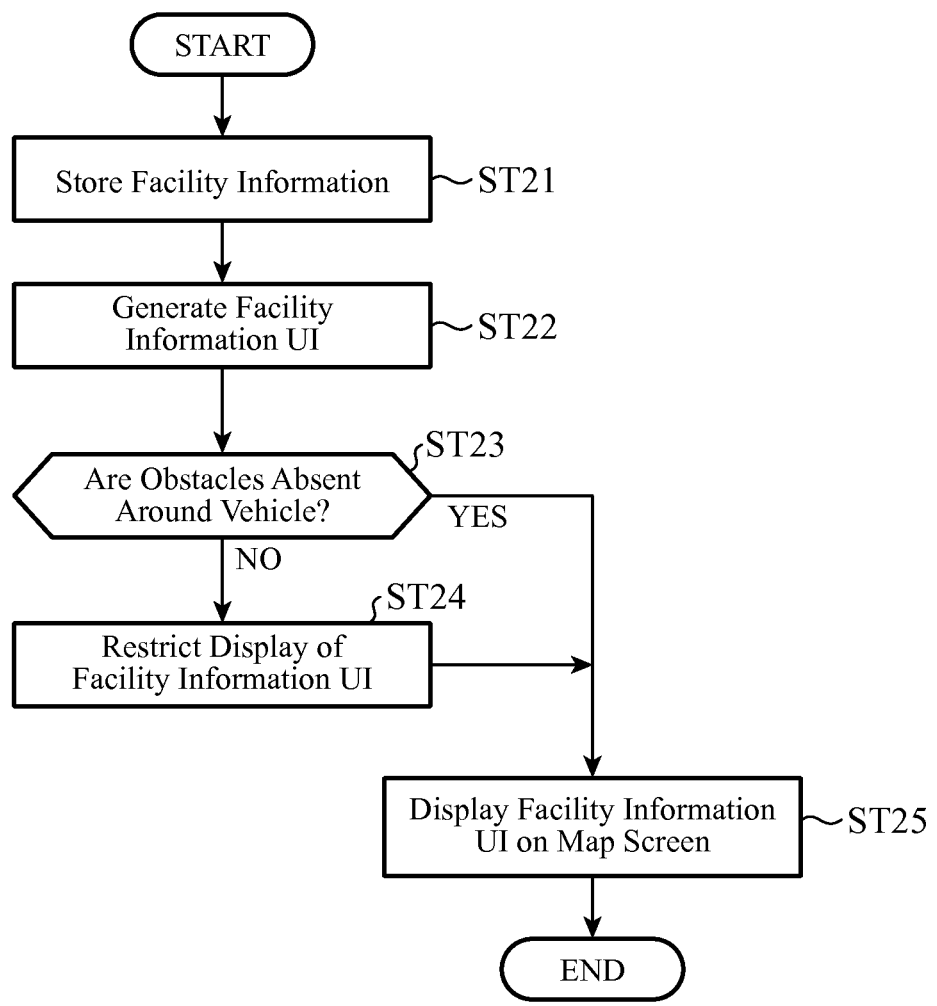
FIG. 5 is a flowchart illustrating a display process for facility information performed by the in-vehicle device according to Embodiment 1.

FIG. 5 is a flowchart illustrating a display process for the facility information performed by the in-vehicle device 1. Here, description is made on the assumption that the facility information that is the search result has already been transmitted from the information distribution server 2.

First, the facility information acquisition section 101 receives the facility information, and the information is stored in the facility information storage section 102 (step ST21). The facility information display control section 103 generates the facility information UI using the facility information stored in the facility information storage section 102 (step ST22). In addition, the facility information display control section 103 checks the presence or absence of the obstacle around the vehicle on the basis of the obstacle information from the obstacle information acquisition section 123. In the absence of the obstacle ("YES" in step ST23), the facility information UI is displayed superimposedly on the map screen displayed and controlled by the map display control section 104 (step ST25).

On the other hand, in the case where the obstacle is present ("NO" in step ST23), the facility information display control section 103 restricts the display of the facility information UI until the obstacle is absent (step ST24).

As described above, according to Embodiment 1, the in-vehicle device 1 is configured to include: the in-vehicle sensor group 12 which acquires the position and the speed of the vehicle and the presence or absence of the obstacle around the vehicle; the search condition storage section 106 which stores the facility search condition input by the user; the search condition setting section 107 which acquires the facility search condition from the search condition storage section 106 each time the acquisition request for the facility information is sent to the information distribution server 2; the facility information acquisition section 101 which regularly transmits, to the information distribution server 2, the acquisition request combined with the position of the vehicle acquired by the in-vehicle sensor group 12 and the facility search condition acquired by the search condition setting section 107 and which receives, from the information distribution server 2, the facility information on the facility located around the vehicle and matching the facility search condition; the facility information display control section 103 which controls the number of displays of the facility information UIs on the basis of the information in the in-vehicle sensor group 12 when the facility information UIs acquired by the facility information acquisition section 101 are displayed on the map; and the map display control section 104 which displays the facility information UIs and the map in an superimposed manner. Therefore, when the facility search is made regularly on the basis of that search condition after setting of the search condition by the user, it is possible to acquire and present the latest information on the facility that suits the taste of the user during travel. In addition, the number of displays of the facility information UIs can be controlled using the information in the in-vehicle sensor group 12, and thus, it is possible to present the facility information UI according to the traveling place, to thereby minimize time and labor for the setting by the user.

In addition, according to Embodiment 1, the communication control section 108 is configured to control the frequency at which the facility information acquisition section 101 transmits the acquisition request on the basis of the information in the in-vehicle sensor group 12. Therefore, the frequency of acquisition can be changed according to the traveling place such that the acquisition request is not transmitted on the expressway having few facilities but transmitted near the exit of the expressway and around the parking area having the existing facilities, to thereby minimize time and labor for the setting by the user.

Additionally, the function of generating the facility information UI in the facility information display control section 103 of the in-vehicle device 1 may be provided to the information distribution server 2 (e.g. the facility information generation section 204). In this case, it is necessary to transmit the vehicle information acquired by the in-vehicle sensor group 12 to the information distribution server 2. Then, it is only necessary that the information distribution server 2 should be configured to include: the facility information DB 202 which stores the facility information; the facility information search section 203 which extracts, from the facility information DB 202, the facility information on the facility located around the vehicle and matching the facility search condition on the basis of the position of the vehicle on which the in-vehicle device 1 is mounted and the facility search condition; the facility information generation section 204 which converts the facility information extracted by the facility information search section 203 into the data format (including the facility information UI) for display on the in-vehicle device 1, and which controls the number of displays of the facility information UIs on the basis of the vehicle information in the in-vehicle sensor group 12; and the facility information transmission section 201 which receives, from the in-vehicle device 1, the acquisition request that includes the vehicle information in the in-vehicle sensor group 12 and the facility search condition and which returns the facility information in the data format generated by the facility information generation section 204.

When the information distribution server 2 is provided with the function of generating the facility information UI and the function of controlling the number of displays of the facility information UIs, it is only necessary that the facility information display control section 103 of the in-vehicle device 1 should have the function of drawing the facility information UI transmitted from the information distribution server 2.

Figure 6:
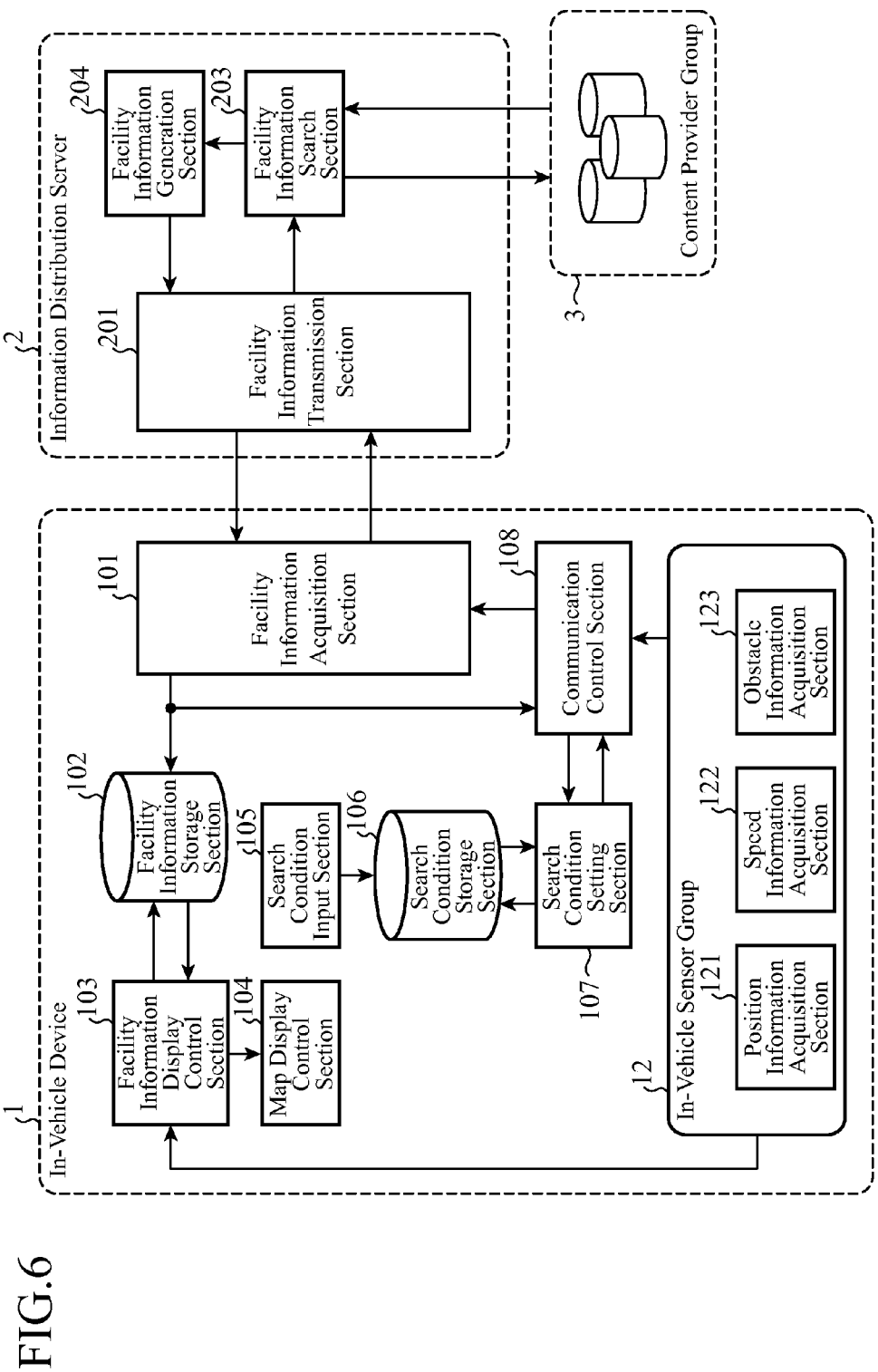
FIG. 6 is a block diagram illustrating a modification of the navigation system according to Embodiment 1.

In addition, in Embodiment 1, the information distribution server 2 is configured to include the facility information DB 202 which stores the facility information, but it is not limited thereto; for example, as illustrated in FIG. 6, the information distribution server 2 may be configured to acquire facility information from an external content provider group 3. In addition, all or some of the functions of the information distribution server 2 including the facility information DB 202 may be provided to the in-vehicle device 1 to regularly update the facility information, and therefore, it is not always necessary to concentrate the facility information in the facility information DB 202 and the search function of the facility information search section 203 on the information distribution server 2.

As described above, it is possible to provide the function of the in-vehicle device 1 to the information distribution server 2 and, conversely, provide the function of the information distribution server 2 to the in-vehicle device 1, and therefore, it is not necessary to stick to the configurations illustrated in FIGS. 1 and 6. This also applies to Embodiments 2 to 6 to be described below.

Embodiment 2

In Embodiment 2, a search condition for facility information and the presentation order of the facility information are dynamically set on the basis of the time and date of use, weather, users on board, facility use history, and so forth in addition to the facility search conditions set in the in-vehicle device 1.

Figure 7:
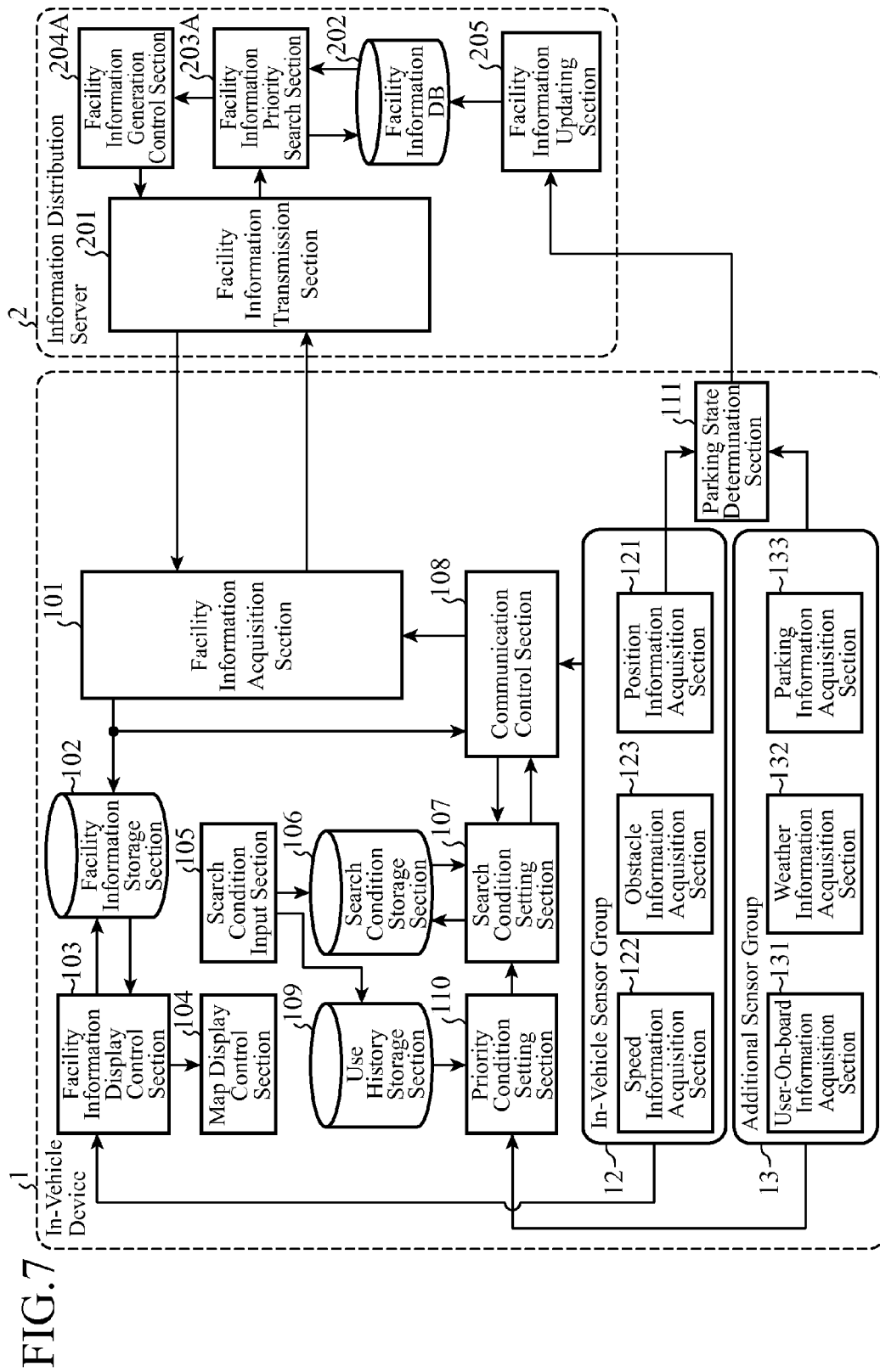
FIG. 7 is a block diagram illustrating a configuration of a navigation system according to Embodiment 2 of the present invention.

FIG. 7 illustrates a configuration of a navigation system according to Embodiment 2.

The in-vehicle device 1 of Embodiment 2 further includes a use history storage section 109, a priority condition setting section 110, a parking state determination section 111, and an additional sensor group 13.

Moreover, the information distribution server 2 of Embodiment 2 further includes a facility information updating section 205. The facility information search section 203 and the facility information generation section 204 illustrated in FIG. 1 are functionally enhanced into a facility information priority search section 203A and a facility information generation control section 204A, respectively.

Note that in FIG. 7, the components that are the same as or equivalent to those in FIGS. 1 to 6 are denoted by the same reference numerals, and descriptions thereof will be omitted or simplified.

The additional sensor group 13 includes a user-on-board information acquisition section 131, a weather information acquisition section 132, and a parking information acquisition section 133. The user-on-board information acquisition section 131 acquires information from devices such as an in-vehicle camera, a speech recognition microphone, and a weight sensor to judge the number and the gender of users on board. The weather information acquisition section 132 communicates with an information source outside an own vehicle, for example, to acquire the weather and the temperature around the vehicle, and the present time and date. The parking information acquisition section 133 acquires ON/OFF information on the parking brake of the vehicle, position information on the engine key, and so forth.

The use history storage section 109 includes a non-volatile memory. When the user sets a destination, the search condition input section 105 acquires the destination (target facility), and the use history storage section 109 stores the destination in the non-volatile memory as history information. The history information is used to set a priority condition during subsequent searches for facility information.

The priority condition setting section 110 sets a presentation order priority condition for prescribing a presentation order of the facility information on the basis of information from the use history storage section 109 and the additional sensor group 13, and notifies the search condition setting section 107 of the condition to add the condition to the facility search condition. The following rule may be set in advance in the priority condition setting section 110: what item of the facility information is increased and decreased in priority under what information in the use history storage section 109 and additional sensor group 13 is used. For example, in the case where it is raining and the number of passengers is large, a presentation order priority condition that preferentially presents a facility with a large housing capacity or a facility having parking equipment is set so that the passengers can avoid rain as much as possible. Meanwhile, in the case where a man alone is on board, for example, the advertisement information on group discount or women only are unavailable, and therefore, the presentation order priority condition that lowers the priority of the above advertisement information is set. In addition, for example, the presentation order priority condition is set in accordance with the use frequency of the facility in the past.

The presentation order priority condition is notified to the facility information acquisition section 101 via the search condition setting section 107 and the communication control section 108, and transmitted to the information distribution server 2 together with the facility search condition.

The parking state determination section 111 determines whether or not the vehicle is in a parking state on the basis of the information in the parking information acquisition section 133 and the position information acquisition section 121. The parking state determination section 111 determines whether or not the vehicle arrives at the destination on the basis of the position information in the position information acquisition section 121, and in the arrival at the destination, determines whether or not the vehicle is in the parking state by determining, on the basis of the information in the parking information acquisition section 133, whether or not an engine key is at an ACC (accessory) position or whether or not a parking brake is in an ON state. On the other hand, in the case where the engine is in a starting state, and the parking brake is in an OFF state, it is determined that the vehicle is in a starting state (parking lot state OFF).

The parking state determination section 111 transmits the determination result of the parking state to the information distribution server 2 together with the information in the user-on-board information acquisition section 131 such as the number of users on board.

The facility information priority search section 203A searches, on the basis of the facility search condition received by the facility information transmission section 201, the facility information DB 202A for the facility that matches the facility search condition.

The facility information generation control section 204A chooses the advertisement information that the users on board are available, from the facility information acquired by the facility information priority search section 203A from the facility information DB 202A, on the basis of the presentation order priority condition, changes the order by changing the presentation order of the advertisement information that the users are not available to the tail end thereof, and converts the resultant into a data format for transmission.

Figure 8:
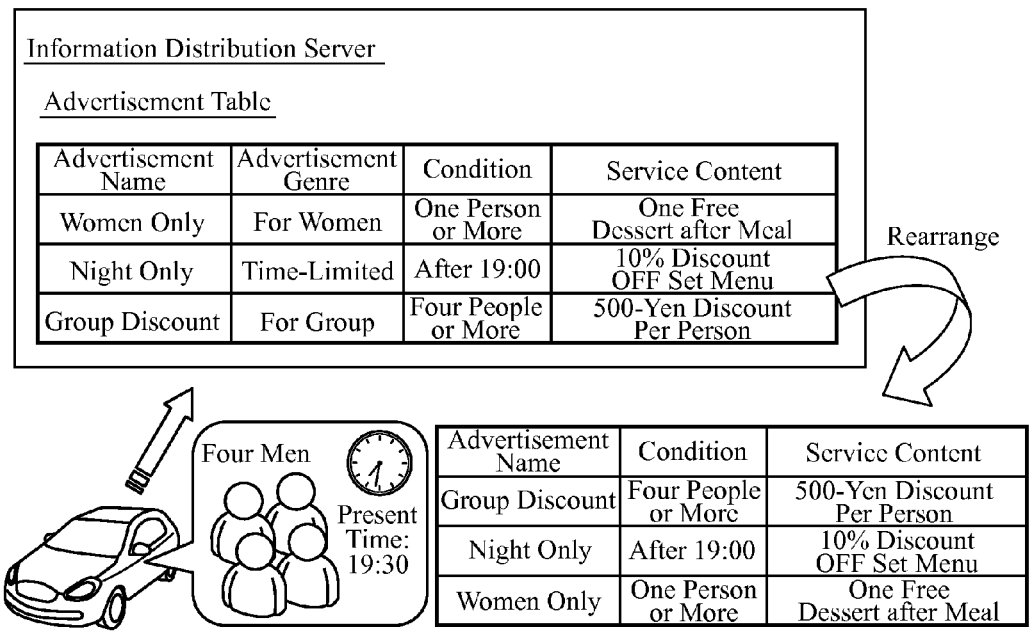
FIG. 8 is a concept diagram illustrating an operation of a facility information priority search section and a facility information generation control section of an information distribution server according to Embodiment 2.

Here, a concept diagram illustrating the operations of the facility information priority search section 203A and the facility information generation control section 204A is illustrated in FIG. 8. In the example of FIG. 8, the condition in FIG. 2 (desired genre: Chinese cuisine, budget priority, popularity priority, acquisition interval: 15 minutes) is set as the facility search condition, and the condition with users on board: four men and the present time: past 19 o'clock is set as the presentation order priority condition. An advertisement table represents a list of advertisement information acquired by the facility information priority search section 203A from the facility information DB 202A. In this state, the advertisement information with an advertisement name "women only" with a low degree of matching with the presentation order priority condition, and the information with the name "group discount" with a high degree of matching with the presentation order priority condition are arranged in random order. When the facility information generation control section 204A rearranges the advertisement table on the basis of the presentation order priority condition, the rank of "group discount" with the high degree of matching with the conditions is raised, and the rank of "women only" with the low degree of matching is lowered.

The facility information updating section 205 updates the items of the seating capacity and the parking lot, among the facility information on the destination stored in the facility information DB 202A, on the basis of the parking state determination result received from the parking state determination section 111 of the in-vehicle device 1, the number of users on board, and so forth.

Figure 9:
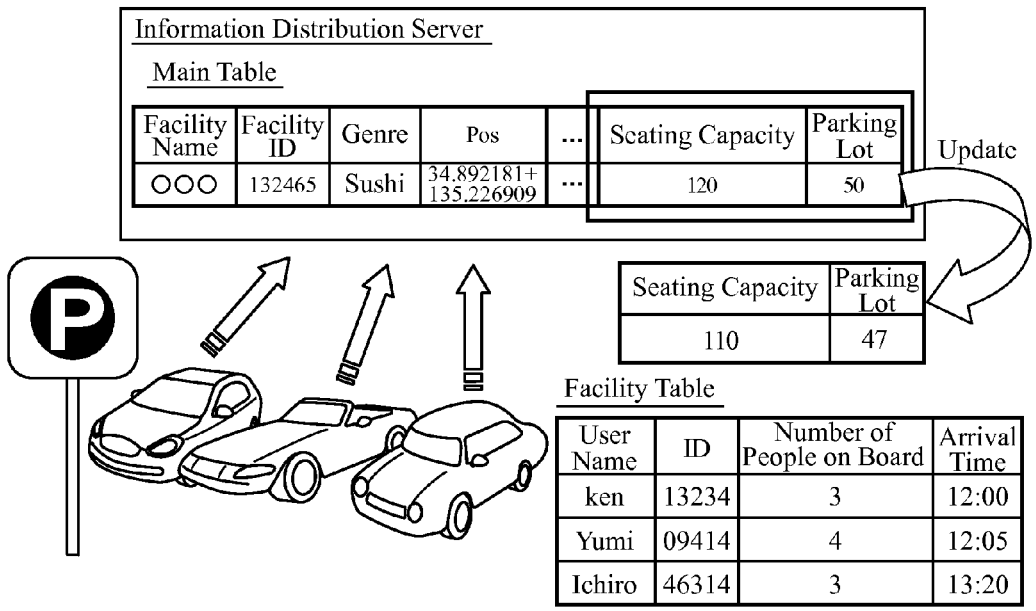
FIG. 9 is a concept diagram illustrating an operation of a facility information updating section of the information distribution server according to Embodiment 2.

Here, a concept diagram illustrating the operation of the facility information generation section 204 is illustrated in FIG. 9. In the example of FIG. 9, the facility information with a facility ID "132465" stored in the facility information priority search section 203A includes the seating capacity (for a restaurant, the number of vacant seats) which represents the housing capacity of the facility, the number of vacant spaces in the parking lot of the facility, and so forth, in addition to the facility name, the genre, and so forth. In the case where three vehicles (three, four, and three in the number of users on board: ten passengers in total) are parked in the parking lot of the facility, the facility information updating section 205 updates the seating capacity in the facility in the main table of the facility information DB 202A from 120 to 110, and updates the information on the parking lot from 50 to 47, on the basis of the parking state determination result transmitted from the parking state determination section 111 of the in-vehicle device 1 and the information on the users on board.

Further, the facility information updating section 205 can also update the information in a facility table generated for each facility as that illustrated in FIG. 9.

Next, an operation of the navigation system according to Embodiment 2 will be described.

Figure 10:
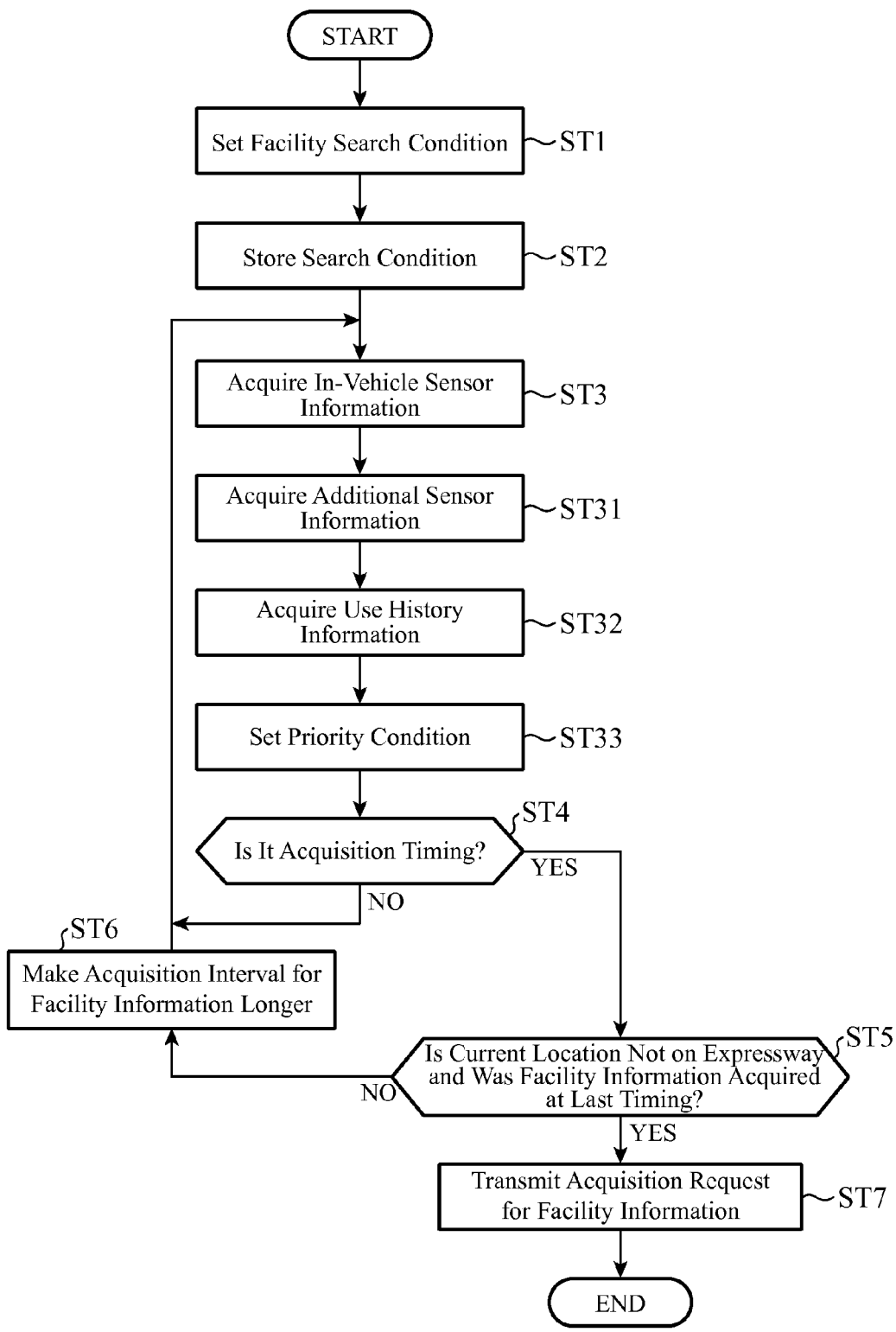
FIG. 10 is a flowchart illustrating an acquisition process for facility information performed by an in-vehicle device according to Embodiment 2.

FIG. 10 is a flowchart illustrating an acquisition process for the facility information performed by the in-vehicle device 1. Steps ST1 to ST7 of FIG. 10 are the same processes as steps ST1 to ST7 illustrated in FIG. 3, respectively, and therefore descriptions thereof are omitted or simplified.

After step ST3, the additional sensor group 13 acquires the information such as the gender and the number of users on board, the weather, and the time and date, and notifies the priority condition setting section 110 of the information (step ST31). The priority condition setting section 110 acquires the use history information on the facility up to the present from the use history storage section 109 (step ST32).

Subsequently, the priority condition setting section 110 selects the information for setting the presentation order priority condition from each sensor information in the additional sensor group 13 and the use history information in the use history storage section 109, and weights the priority to each item of the facility information (step ST33).

After that, when an acquisition timing comes, the communication control section 108 notifies the facility information acquisition section 101 of the position information in the position information acquisition section 121, the facility search condition set by the search condition setting section 107, and the presentation order priority condition set by the priority condition setting section 110, and transmits such information and conditions to the information distribution server 2 as an acquisition request for facility information (step ST7).

Figure 11:
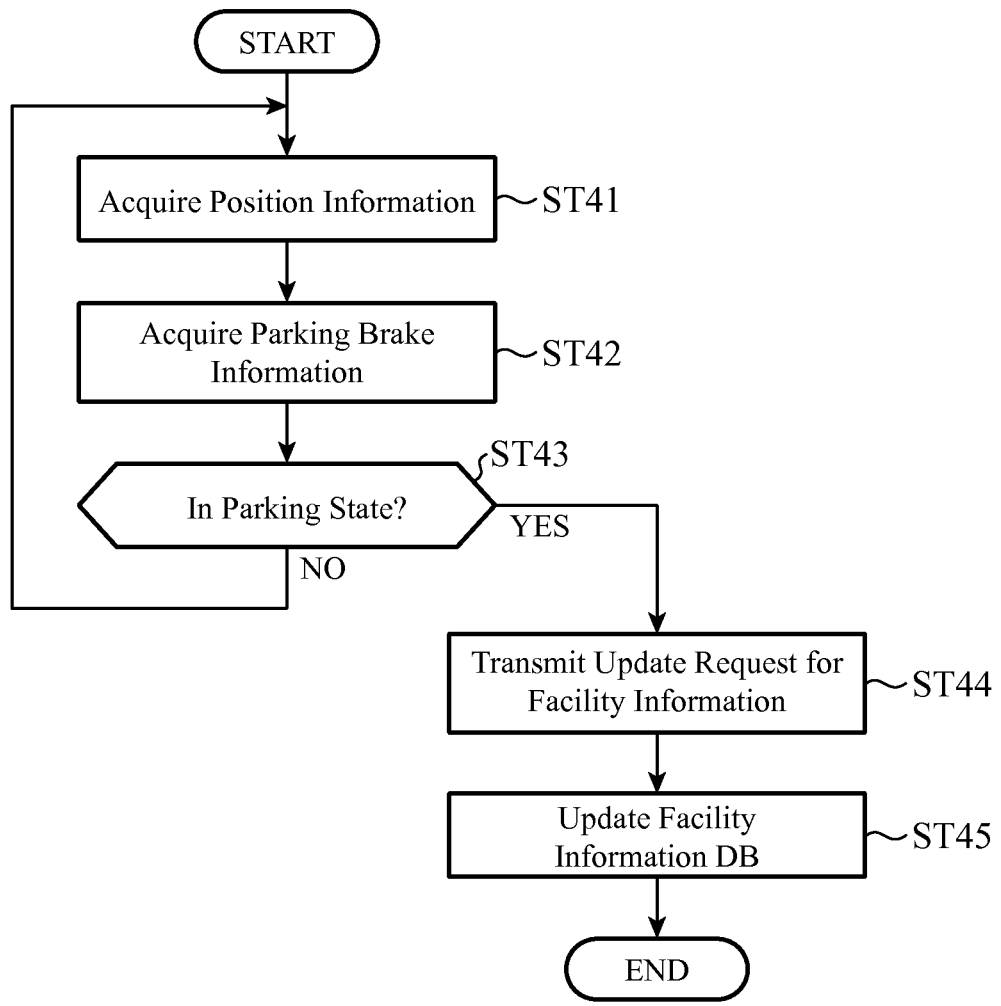
FIG. 11 is a flowchart illustrating an updating process for a facility information DB of the information distribution server according to Embodiment 2, illustrating an example at the time of arrival at a target facility.

FIG. 11 is a flowchart illustrating an updating process for the facility information DB 202A. Here, the updating process performed when the vehicle on which the in-vehicle device 1 is mounted has reached the target facility is described.

In the in-vehicle device 1, the position information acquisition section 121 of the in-vehicle sensor group 12 acquires the position information on the vehicle (step ST41). In addition, the parking information acquisition section 133 of the additional sensor group 13 acquires the ON/OFF information on the parking brake (step ST42).

In the case where it is determined on the basis of the position information and the ON/OFF information on the parking brake that the vehicle is located around the target facility and is in the parking state ("YES" in step ST43), the parking state determination section 111 transmits, to the facility information updating section 205 of the information distribution server 2, an update request for the housing capacity of the target facility and the use status of the parking lot (step ST44). On the other hand, in the case where the vehicle is not in the parking state ("NO" in step ST43), the parking state determination section 111 stands by until the vehicle is in the parking state.

When the update request is received from the in-vehicle device 1, the facility information updating section 205 of the information distribution server 2 updates the items of the housing capacity and the parking lot, among the facility information on the target facility stored in the facility information DB 202A (step ST45). In this case, the number of spaces available for parking is reduced since the vehicle is parked, and the housing capacity of the facility is reduced by the number of users on board.

Figure 12:
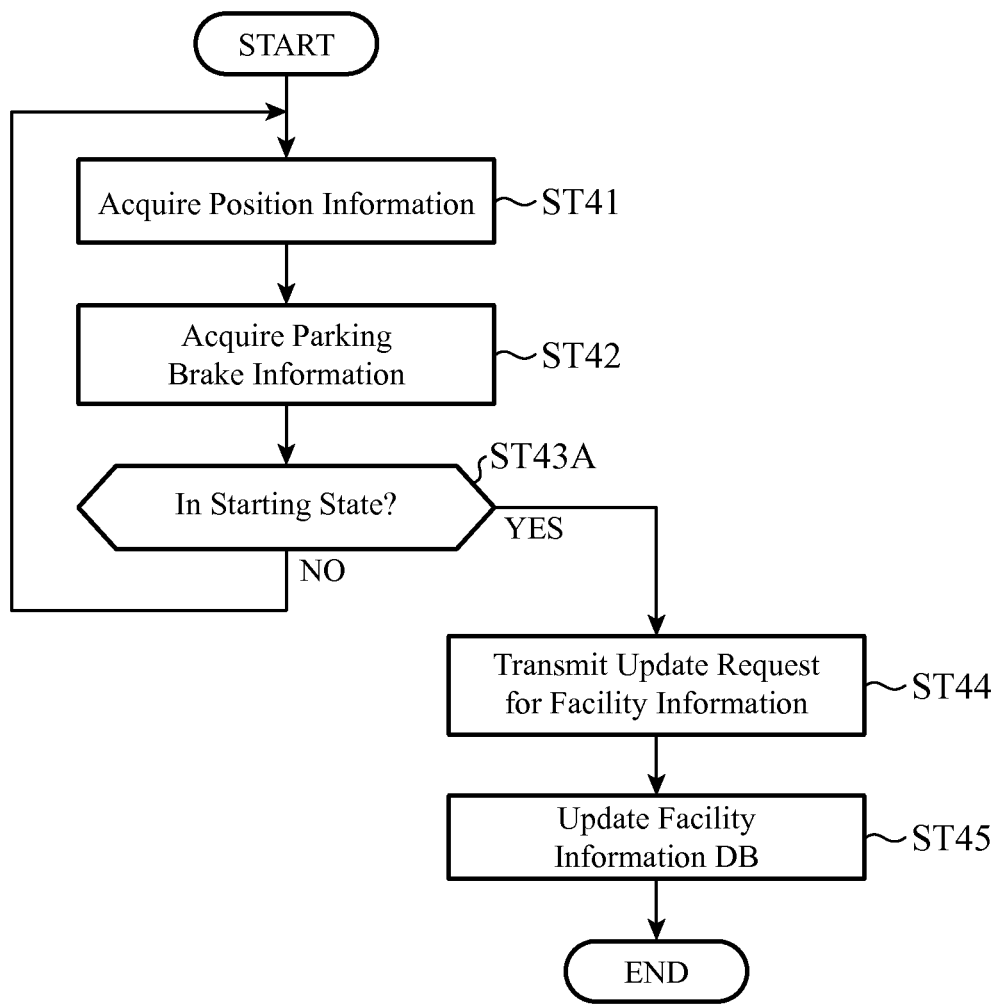
FIG. 12 is a flowchart illustrating the updating process for the facility information DB of the information distribution server according to Embodiment 2, illustrating an example at the time of departure from a target facility.

FIG. 12 is the flowchart illustrating the updating process for the facility information DB 202A. Here, the updating process performed when the vehicle on which the in-vehicle device 1 is mounted has left the target facility is described.

After the processes that are similar to those in steps ST41 and ST42 of FIG. 11, the parking state determination section 111 determines whether or not the vehicle is in the starting state in step ST43A on the basis of the position information and the ON/OFF information on the parking brake. In the case where it is determined that the vehicle is leaving the target facility and in the starting state ("YES" in step ST43A), the parking state determination section 111 transmits, to the facility information updating section 205 of the information distribution server 2, the update request for the housing capacity of the target facility and the use status of the parking lot (step ST44). On the other hand, in the case where the vehicle is not in the starting state ("NO" in step ST43A), the parking state determination section 111 stands by until the vehicle is in the starting state.

In the update in this case, the number of spaces available for parking is increased since the vehicle leaves the parking lot, and the housing capacity of the facility is increased by the number of users on board.

Figure 13:
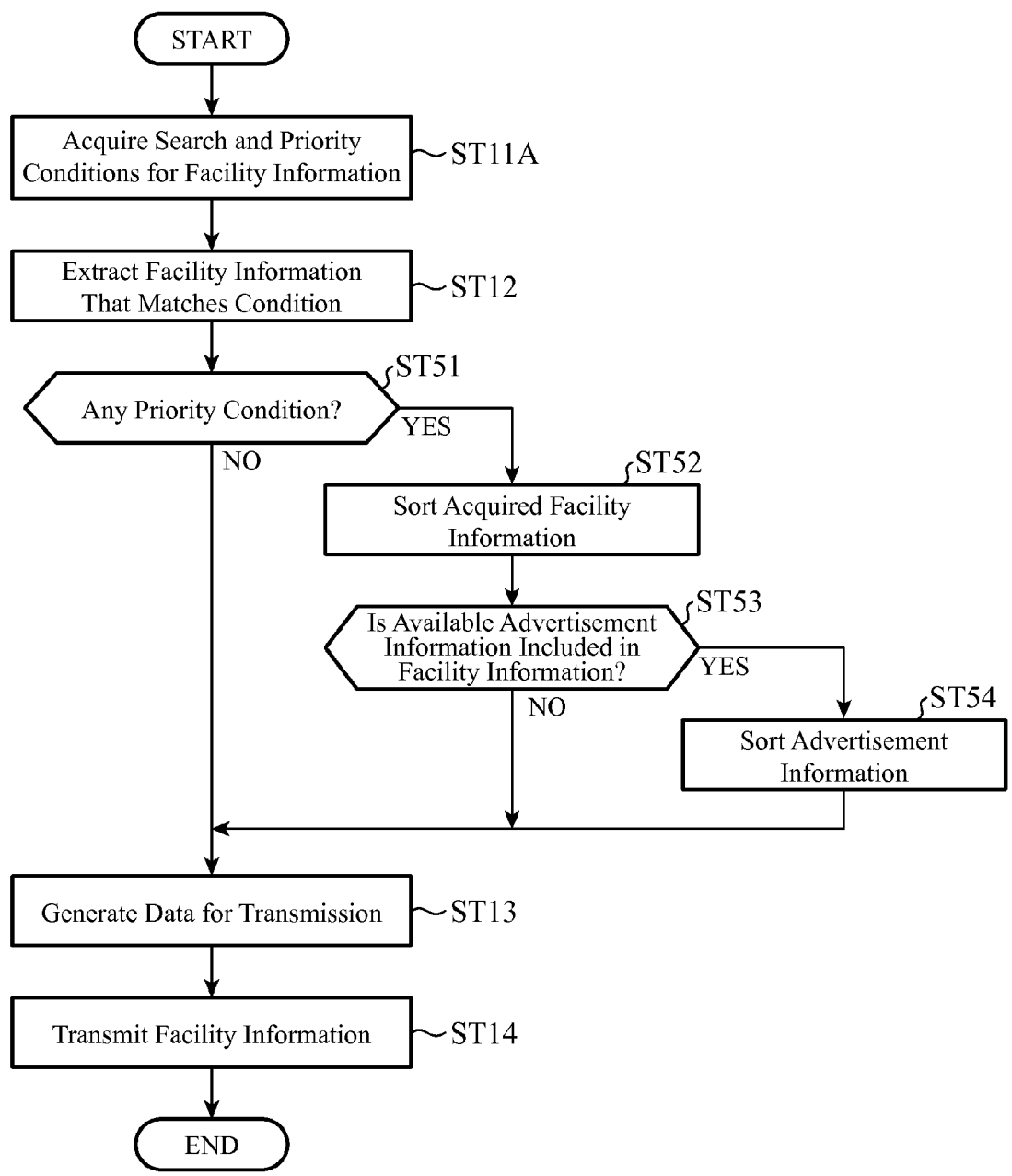
FIG. 13 is a flowchart illustrating a search and distribution process for the facility information performed by the information distribution server according to Embodiment 2.

FIG. 13 is a flowchart illustrating a search and distribution process for the facility information performed by the information distribution server 2. Here, it is described on the assumption that the facility search condition and presentation order priority condition have already been transmitted from the in-vehicle device 1. In addition, it is assumed that the facility information priority search section 203A is updated at any time in accordance with the flowcharts of FIGS. 11 and 12. Note that Steps ST12 to ST14 of FIG. 13 are the same processes as steps ST12 to ST14 illustrated in FIG. 4, respectively, and therefore descriptions thereof are omitted or simplified.

First, the facility information transmission section 201 acquires the facility search condition and the presentation order priority condition transmitted by the in-vehicle device 1, and notifies the facility information priority search section 203A of the conditions (step ST11A). The facility information priority search section 203A extracts the facility information on the facility that matches the facility search condition from the facility information DB 202 (step ST12). In the case where there is the presentation order priority condition ("YES" in step ST51), the facility information generation control section 204A sorts the extracted facility information in accordance with the condition (step ST52). In addition, in the case where the available advertisement information that matches the presentation order priority condition is included in the facility information ("YES" in step ST53), the facility information generation control section 204A sorts the facility information in accordance with the condition (step ST54).

On the other hand, in the case where there is no presentation order priority condition ("NO" in step ST51) or in the case where no available advertisement information is included ("NO" in step ST53), the facility information generation control section 204A converts the facility information extracted by the facility information priority search section 203A as it is into the data format for transmission (step ST13), and it is transmitted from the facility information transmission section 201 to the in-vehicle device 1 (step ST14).

As described above, according to Embodiment 2, it is configured that the facility information priority search section 203A extracts the facility information from the facility information DB 202A on the basis of the position of the vehicle and the facility search condition, among the acquisition requests received by the information distribution server 2, and that the facility information generation control section 204A rearranges the facility information on the basis of the presentation order priority condition to distribute the rearranged information to the in-vehicle device 1. For this reason, the process on the in-vehicle device 1 side can be reduced by changing the order of the facility information to be transmitted from the information distribution server 2 to the in-vehicle device 1. In the case where the information that can be displayed on the display of the in-vehicle device 1 is limited, the screen can be used effectively, and the user can save viewing unnecessary facility information.

In addition, according to Embodiment 2, it is configured that the facility information updating section 205 receives, from the in-vehicle device 1, the information that indicates whether or not the vehicle is in the parking state in the parking lot attached to the facility, and that the facility information DB 202A updates the use status of the parking lot of the facility managed as the facility information.

Consequently, at least the trend of the users that possess the in-vehicle device 1 which can communicate with the information distribution server 2 can be grasped, which makes it possible to roughly estimate the degrees of congestion in the facility and the parking lot of the facility, to thereby provide the in-vehicle device 1 with the facility information including the latest use status.

Additionally, the function of rearranging the facility information on the basis of the presentation order priority condition, in the facility information generation control section 204A of the information distribution server 2, may be provided to the in-vehicle device 1 (e.g. the facility information display control section 103). In this case, it is only necessary in the in-vehicle device 1 that the priority condition setting section 110 should set at least one information of the pieces of information from the user-on-board information acquisition section 131, the weather information acquisition section 132, and the use history storage section 109 as the presentation order priority condition for the facility information, and that the facility information display control section 103 should rearrange the display order of the facility information received from the information distribution server 2 on the basis of the presentation order priority condition.

Consequently, the priority condition for the display of facility information UIs can be set automatically using the information in the additional sensor group 13 and the use history storage section 109. Thus, it is possible to sequentially present the facility information with the use condition that matches the number and the gender of people on board, to thereby minimize time and labor for a setting by the user.

As a result, it is possible to preferentially present the information on the facility with the large housing capacity when the number of people on board is large, and to preferentially present the information on the facility with the parking equipment when it is raining, for example, even if no user makes the setting. On the contrary, when the man alone is on board, for example, the degree of priority of information on the facility with a coupon for the group or women is reduced, which is less likely to be presented.

In addition, according to Embodiment 2, the in-vehicle device 1 is configured to include: the parking information acquisition section 133 which acquires the information that indicates the state of at least one of the engine and the parking brake of the vehicle; and the parking state determination section 111 which determines, on the basis of the information acquired by the parking information acquisition section 133, whether or not the vehicle is in the parking state in the parking lot attached to the facility, and transmits the determination result to the information distribution server 2, and updates the parking lot use status of the facility included in the facility information held by the information distribution server 2.

As mentioned above, when that the vehicle is using the parking lot of the facility is notified to the information distribution server 2, at least the trend of the users that possess the in-vehicle device 1 which can communicate with the information distribution server 2 can be grasped, which makes it possible to roughly estimate the degrees of congestion in the facility and the parking lot of the facility. Thus, the in-vehicle device 1 can acquire and present the facility information including the latest use status.

Further, according to Embodiment 2, the parking state determination section 111 is configured to transmit to the information distribution server 2 the number of users on board acquired by the user-on-board information acquisition section 131 together with the parking determination result based on the parking information, and to update the use status of the facility included in the facility information held by the information distribution server 2.

Consequently, the information distribution server 2 can roughly grasp the trend of the number of users that uses the facility in addition to the parking lot use status of the facility. Thus, the in-vehicle device 1 can acquire and present more specific facility information including the latest use status.

Embodiment 3

In Embodiment 3, in the case where a facility information search section 203 of an information distribution server 2 (or in-vehicle device 1) has no facility information that matches a facility search condition, the corresponding facility information is acquired from an external Web service.

Figure 14:
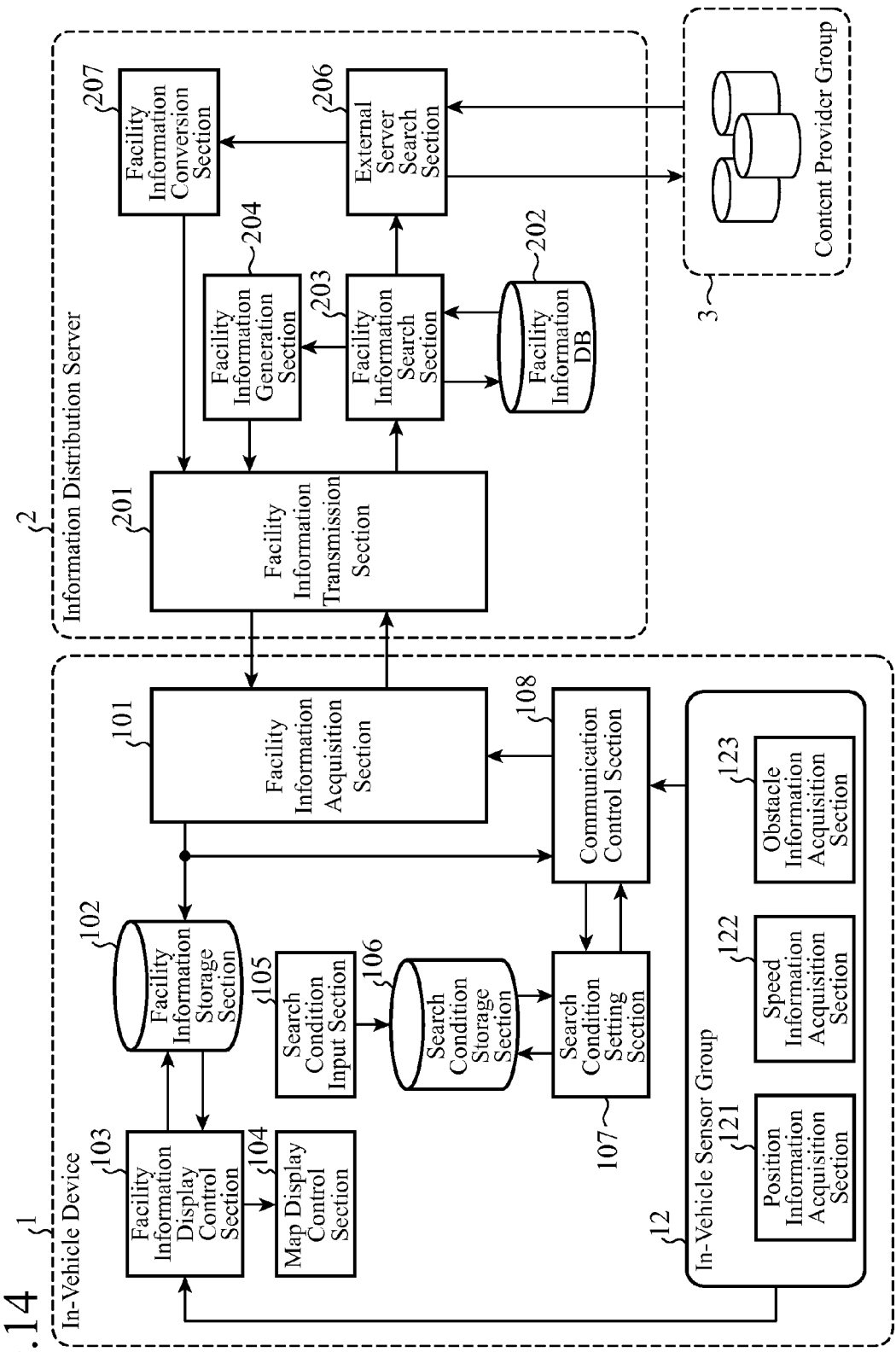
FIG. 14 is a block diagram illustrating a configuration of a navigation system according to Embodiment 3 of the present invention.

FIG. 14 illustrates a configuration of a navigation system according to Embodiment 3.

The navigation system according to Embodiment 3 includes a content provider group 3 in addition to the in-vehicle device 1 and information distribution server 2 according to the above Embodiment 1.

In addition, the information distribution server 2 according to Embodiment 3 further includes an external server search section 206 and a facility information conversion section 207.

Note that in FIG. 14, the components that are the same as or equivalent to those in FIGS. 1 to 6 are denoted by the same reference numerals, and descriptions thereof will be omitted or simplified.

The content provider group 3 is assumed to be the plurality of Web services that are external to the information distribution server 2 and that handle the facility information that is not present in the facility information search section 203 of the information distribution server 2.

The external server search section 206 acquires the facility information that matches the facility search condition from a search service of the content provider group 3. At this time, the facility information acquired from the content provider group 3 may be different in data format, notation, or the like from the facility information acquired from the facility information search section 203. In addition, possessed information and features are different for each search service in the content provider group 3. Therefore, the facility information conversion section 207 is added to the information distribution server 2 so that the facility information conversion section 207 converts the facility information acquired from the content provider group 3 into the same data format as that in the facility information generation section 204. Additionally, the information with the feature is added thereto and transmitted to the in-vehicle device 1 even if it is not a prescribed item of the facility information.

Figure 15:
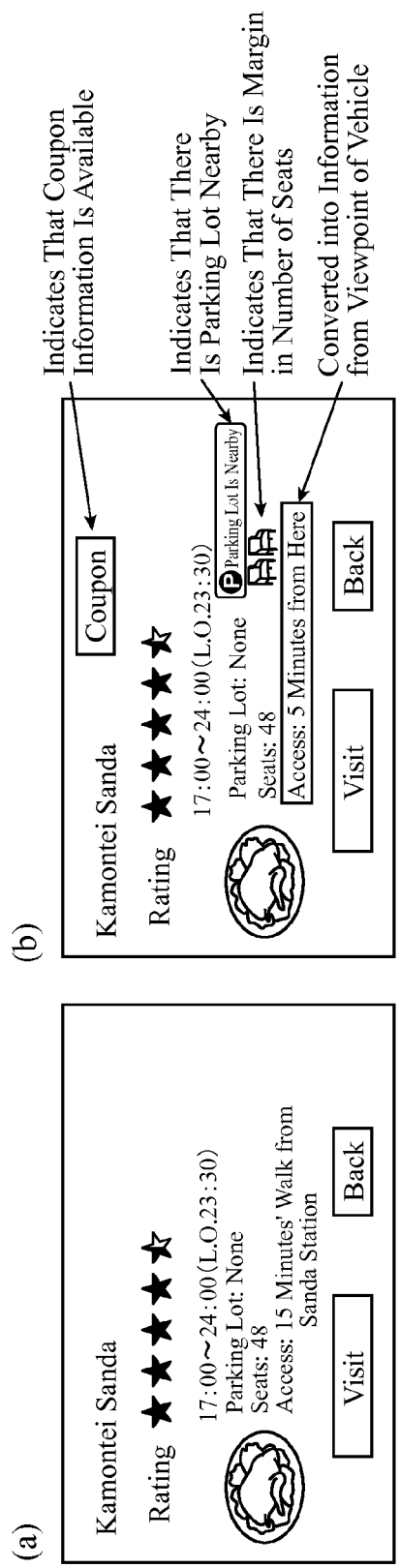
FIG. 15 illustrates an example of a facility information UI of an in-vehicle device according to Embodiment 3.

Here, an example of a facility information UI to be displayed on the display of the in-vehicle device 1 by the facility information display control section 103 is illustrated in FIG. 15. It is assumed that the facility information UI based on the facility information acquired from a certain content provider of the content provider group 3 is a state in FIG. 15(a), for example. In the case where the facility information acquired from the search service of the content provider that is different from the search service provided by the content provider includes coupon information (a type of advertisement information) on the facility includes the information indicating that there is a parking lot around the facility, or includes the information indicating that there is a margin in the number of seats in the facility, for example, the facility information conversion section 207 can add the above information to the facility information of FIG. 15(a) to present the facility information UI as shown in FIG. 15 (b) to a user. In addition, the facility information conversion section 207 may add to the facility information a required time such as "access: 15 minutes' walk from Sanda Station" after being converted into the required time from an own vehicle position to the facility.

Next, an operation of the navigation system according to Embodiment 3 will be described.

Figure 16:
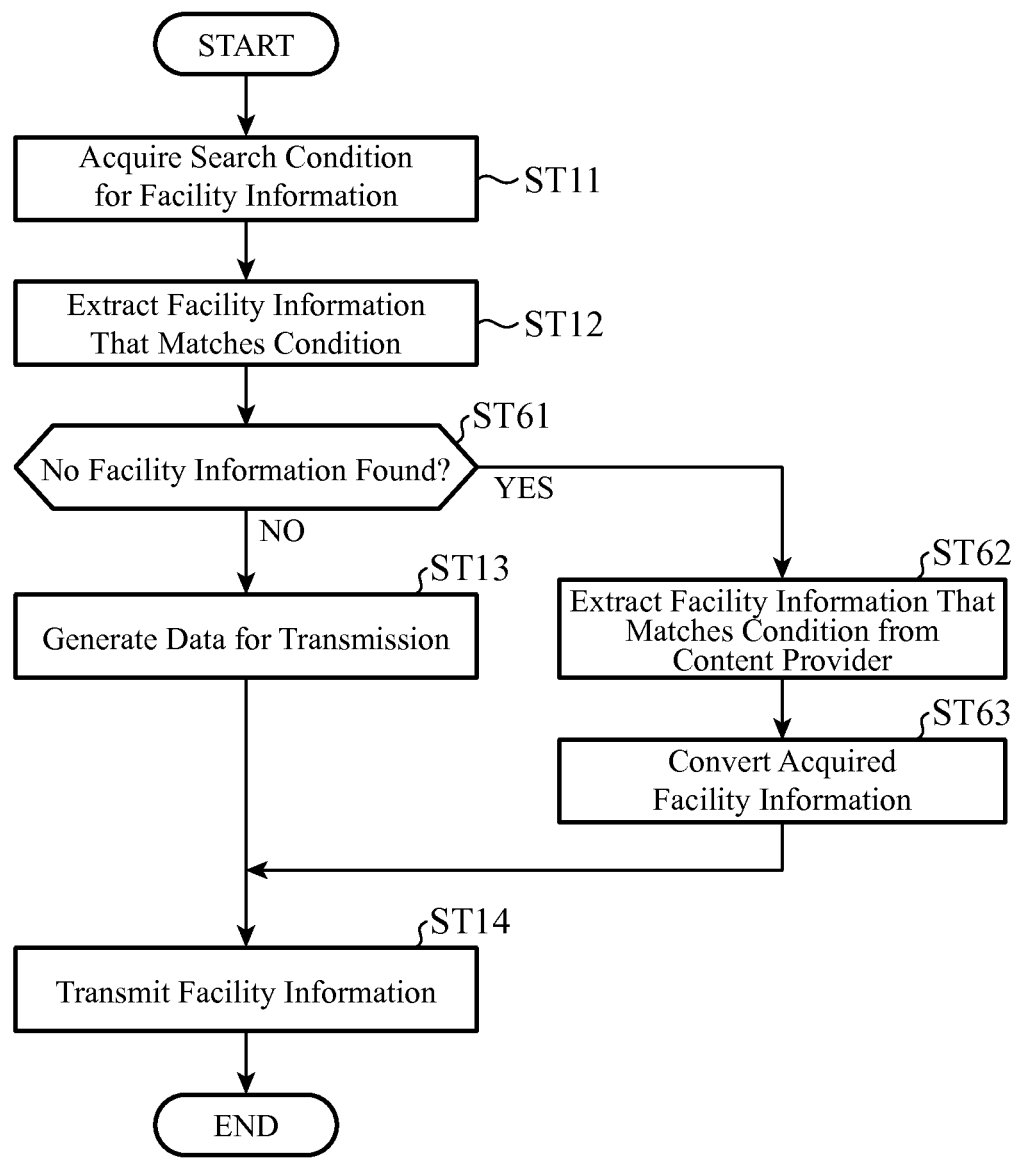
FIG. 16 is a flowchart illustrating a search and distribution process for facility information performed by an information distribution server according to Embodiment 3.

FIG. 16 is a flowchart illustrating a search and distribution process for the facility information performed by the information distribution server 2. Here, it is described on the assumption that the facility search condition has already been transmitted from the in-vehicle device 1. Note that steps ST11 to ST14 of FIG. 16 are the same processes as steps ST11 to ST14 illustrated in FIG. 4, respectively, and therefore descriptions thereof will be omitted or simplified.

In step ST12, the facility information search section 203 searches the facility information DB 202 using the facility search condition. In the case where the facility information that matches the condition cannot be acquired ("YES" in step ST61), a search request that includes the facility search condition is notified from the facility information search section 203 to the external server search section 206. Then, the external server search section 206 acquires the facility information that matches the facility search condition from the content provider group 3 (step ST62). Subsequently, the facility information conversion section 207 gathers the facility information, and converts the facility information into a data format for transmission (step ST63), and it is transmitted from the facility information transmission section 201 to the in-vehicle device 1 (step ST14).

On the other hand, In the case where the facility information that matches the facility search condition is found in the facility information DB 202 ("NO" in step ST61), the facility information generation section 204 converts the facility information into the data format for transmission (step ST13), and it is transmitted from the facility information transmission section 201 to the in-vehicle device 1 (step ST14).

As described above, according to Embodiment 3, the information distribution server 2 is configured to include: the external server search section 206 which extracts from the external content provider group 3 the facility information on the facility located around the vehicle and matching the facility search condition; and the facility information conversion section 207 that converts the facility information into the information from the viewpoint of the vehicle when the facility information extracted by the external server search section 206 is converted into the same data format as the data format in the facility information generation section 204. Therefore, the in-vehicle device 1 can use the facility information held by the Web service other than the information distribution server 2.

Incidentally, in Embodiment 3, in the case where the facility information DB 202 has no facility information that matches the facility search condition, it is configured that the facility information is acquired from the content provider group 3, but it is not limited thereto; it may be configured that the respective pieces of facility information are acquired from the facility information DB 202 and the content provider group 3, gathered into one piece, and transmitted to the in-vehicle device 1.

In addition, it may be configured that when the search condition setting section 107 sets the facility search condition in the in-vehicle device 1, for example, the condition that designates the search service of the content provider group 3 is added thereto so that the facility information held by the content provider group 3 is acquired via the information distribution server 2.

In addition, in the above description, the configuration according to Embodiment 3 is applied to the configuration shown in the above Embodiment 1, but it is not limited thereto; the configuration according to Embodiment 3 may be applied to the configuration shown in the above Embodiment 2.

Embodiment 4

In Embodiment 4, the in-vehicle device 1 is configured to acquire and present facility information (hereinafter, rest facility information) on a facility that is located around an own vehicle and that enables taking a rest when the driver is fatigued. Moreover, it is configured that in addition to a presentation method of displaying the facility information on a display, a presentation method of audibly outputting the information from a speaker is also carried out.

Figure 17:
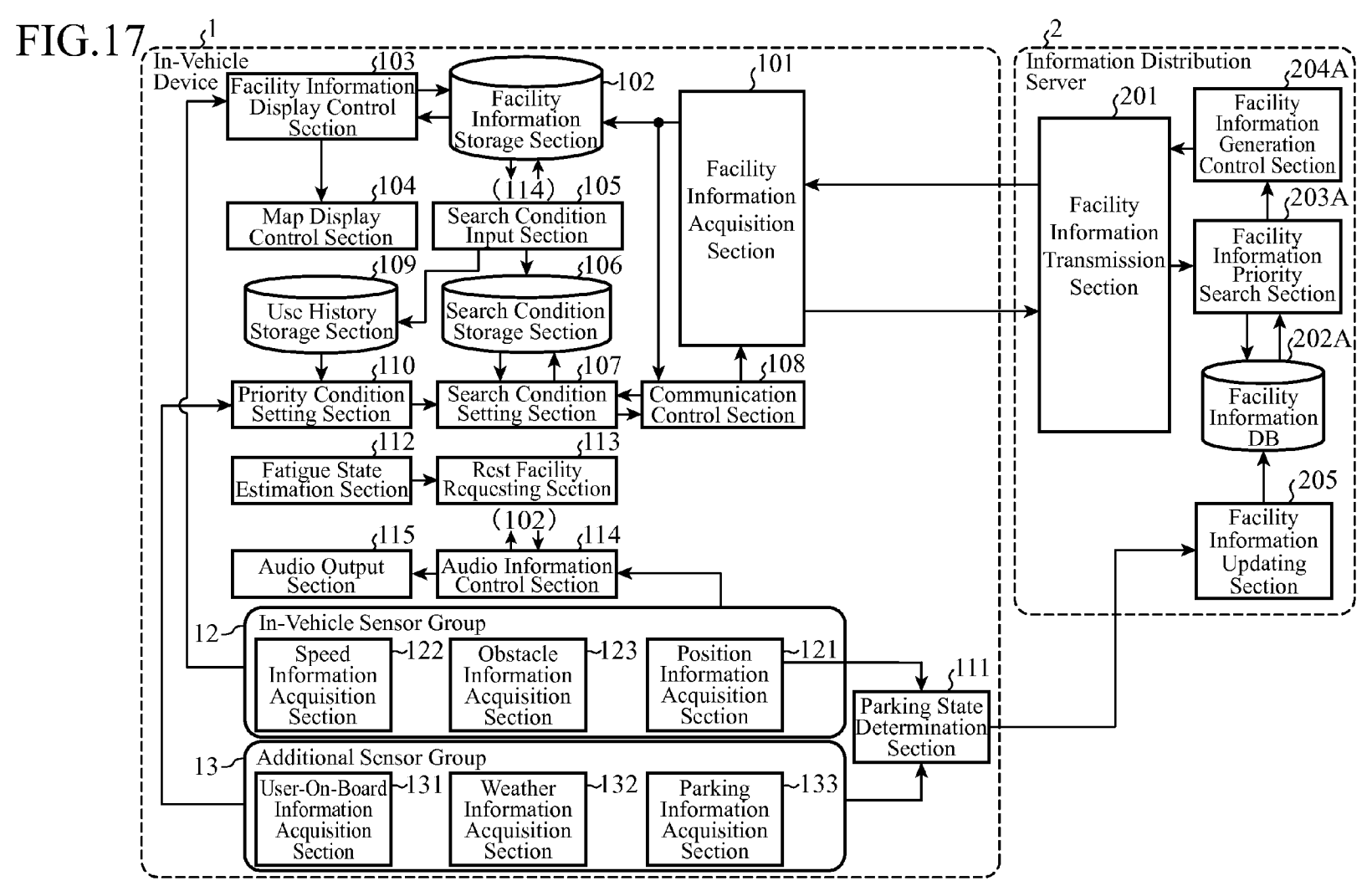

FIG. 17 illustrates a configuration of a navigation system according to Embodiment 4. Here, components for implementing the function of Embodiment 4 are added to the configuration of Embodiment 2.

The in-vehicle device 1 according to Embodiment 4 further includes a fatigue state estimation section 112, a rest facility requesting section 113, an audio information control section 114, and an audio output section 115.

Note that in FIG. 17, the components that are the same as or equivalent to those in FIGS. 7 to 13 are denoted by the same reference numerals, and descriptions thereof will be omitted or simplified.

The fatigue state estimation section 112 acquires information from devices such as an in-vehicle camera, a heart rate meter, an electroencephalograph, and a weight sensor, and estimates the fatigue state of the driver by an estimation method based on heart rate variability components, eye motion, driving posture, and so forth of the driver. Then, in the case where it is judged that the degree of fatigue is high, the fatigue state estimation section 112 notifies the rest facility requesting section 113 to acquire the facility information on the facility that enables taking the rest. Incidentally, the estimation method of the fatigue state is diversified as mentioned above, and may be performed using a single sensor or a combination of sensors, and the method is not specifically limited. Additionally, the fatigue state estimation section 112 may include the above group of sensors, or may acquire the information from the group of sensors mounted on the vehicle.

When the notification comes from the fatigue state estimation section 112, the rest facility requesting section 113 sets such a facility search condition as will search for the facility information on the facility that enables taking the rest, that is located around an own vehicle, and that has a margin in the parking lot and the number of seats, and notifies the communication control section 108 of the condition.

The communication control section 108 notifies the facility information acquisition section 101 of the position information on the vehicle acquired by the position information acquisition section 121 and the facility search condition notified from the rest facility requesting section 113, and transmits an acquisition request for the rest facility information. In the case where the communication control section 108 is controlled so as to transmit the acquisition request for the facility information at a regular timing as in Embodiments 1 to 3, the facility information acquisition section 101 is controlled so as to transmit the acquisition request for the rest facility information separately from the acquisition at the regular timing.

The audio information control section 114 acquires the facility information that enables taking the rest acquired by the facility information acquisition section 101 and stored in the facility information storage section 102 and acquires the position information on the vehicle from the position information acquisition section 121 to thus judge the positional relationship between each facility and the vehicle. The audio information control section 114 sets the information from the rest facility information to be audibly output and the output timing of the information in consideration of the arrival time, the route, the travel speed, etc. from the vehicle position to each facility. For example, in the case where the driver is fatigued, it is desirable to reach the rest facility immediately, and thus the facility information on the facility with a short arrival time from the vehicle position to the rest facility is preferentially audibly output. Meanwhile, for example, the fatigued driver is considered to have a reduced situation judgment ability, and thus the facility information on the facility that can be reached through a simple route is preferentially audibly output. In addition, the timing of performing the audio output is set significantly before the rest facility in the case where the travel speed of the vehicle is high on the basis of the speed information in the speed information acquisition section 122 so that the driver who has heard the audio output for the rest facility information can drive with allowance of time.

In addition, the audio information control section 114 decides what item of the items (e.g. advertisement information) included in the rest facility information, is preferentially presented in the information. For example, in the case where the rest facility has a specialty, a feature, and the like, such information is preferentially converted into audio information, because the audio output of such information may act to make the driver interested in the rest facility.

The audio information control section 114 notifies the audio output section 115 of the audio information on the rest facility generated as described above and the information on the output timing.

The audio output section 115 controls an audio reproduction device such as a speaker and a headphone mounted on the vehicle, and audibly outputs the audio information output from the audio information control section 114.

Figure 18:
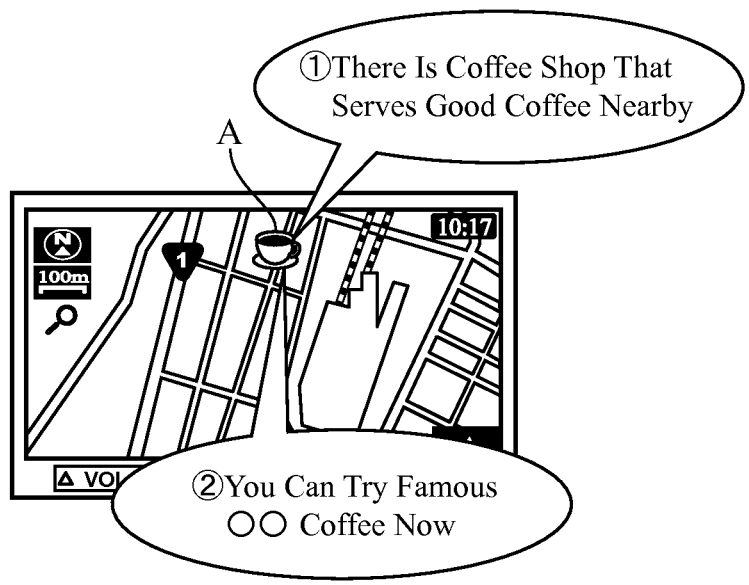
FIG. 18 illustrates an example of presentation of rest facility information performed by an in-vehicle device according to Embodiment 4.

Here, an example of presentation of the rest facility information made by the in-vehicle device 1 is illustrated in FIG. 18. In the example of FIG. 18, the facility information display control section 103 displays superimposedly the facility information UI for a rest facility A on the map screen displayed on the display by the map display control section 104, and the audio output section 115 performs audio guidance for the rest facility A such as "There is a coffee shop that serves good coffee nearby" and "You can try the famous OO coffee now" to guide the driver having the high degree of fatigue to the rest facility.

Additionally, an audio reproduction device that can reproduce stereophony may be used as the output destination of the audio output section 115. In this case, when the audio information control section 114 generates the audio information, the direction (hereinafter, audio source direction) in which audio information on a rest facility is output is set in accordance with the relative positional relationship between the display position of the rest facility information UI and the vehicle position on the map screen. Then, the audio output section 115 controls a plurality of speakers of a stereophony reproduction device so as to audibly output the audio information on the rest facility from the set audio source direction.

Figure 19:
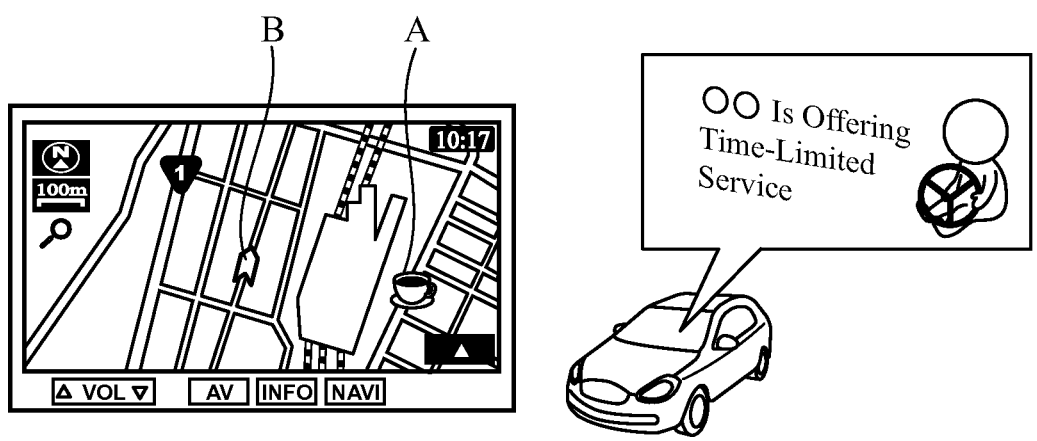
FIG. 19 illustrates an example of presentation of rest facility information performed by the in-vehicle device according to Embodiment 4 through stereophony.

Here, an example of presentation of the rest facility information made by the in-vehicle device 1 through the stereophony is illustrated in FIG. 19. A rest facility A is located to the east of an own vehicle position B indicated by an arrow (to the right of the driver) on the map screen. Thus, the audio output section 115 performs audio guidance of "OO is offering a time-limited service" from the right side of the driver to allow the driver to intuitively understand the direction in which the rest facility is located.

Next, an operation of the navigation system according to Embodiment 4 will be described.

Figure 20:
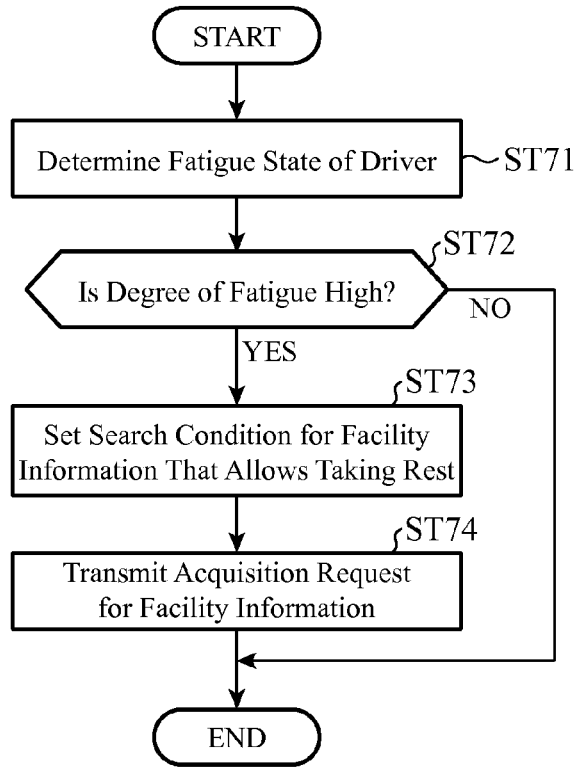
FIG. 20 is a flowchart illustrating an acquisition process for rest facility information performed by the in-vehicle device according to Embodiment 4.

FIG. 20 is a flowchart illustrating an acquisition process for the rest facility information performed by the in-vehicle device 1.

First, the fatigue state estimation section 112 acquires various types of sensor information obtained by sensing the state of the driver, and estimates the degree of fatigue of the driver (step ST71). In the case where the fatigue state estimation section 112 judges from the estimation result that the degree of fatigue is high ("YES" in step ST72), the rest facility requesting section 113 sets on the basis of the information from the in-vehicle sensor group 12 the facility search condition with a high degree of priority given to the rest facility that is located around the vehicle and that is highly likely to gain entry (step ST73).

After that, the communication control section 108 notifies the facility information acquisition section 101 of the facility search condition set by the rest facility requesting section 113, and transmits the acquisition request for the rest facility information (step ST74).

On the other hand, in the case where the fatigue state estimation section 112 judges that the degree of fatigue of the driver is low ("NO" in step ST72), the process is ended.

When the flowchart of FIG. 20 is regularly performed, the information on the rest facility can be automatically acquired from the information distribution server 2 without the need for the user to make a setting when the degree of fatigue of the driver is high.

Figure 21:
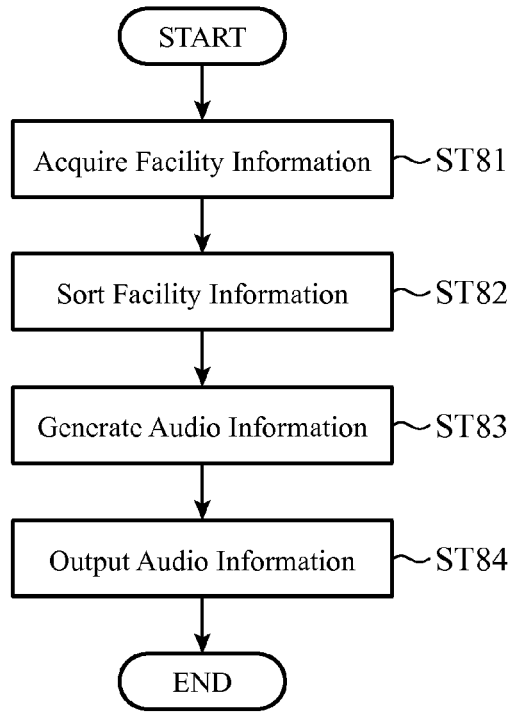
FIG. 21 is a flowchart illustrating an audio output process for rest facility information performed by the in-vehicle device according to Embodiment 4.

FIG. 21 is a flowchart illustrating an audio output process for the rest facility information performed by the in-vehicle device 1. Here, description is made on the assumption that the rest facility information that is the search result has already been transmitted from the information distribution server 2.

First, the facility information acquisition section 101 receives the rest facility information, and the information is stored in the facility information storage section 102 (step ST81). The audio information control section 114 sorts on the basis of the information in the in-vehicle sensor group 12 the rest facility information stored in the facility information storage section 102 in the order of shortness of the arrival time (or simplicity of the route etc.) (step ST82). Subsequently, the audio information control section 114 selects the information to be audibly output from the rest facility information, and generates the audio information (step ST83). In addition, in the case where the stereophony reproduction device is used, the audio information control section 114 sets the audio source direction on the basis of the position information on the vehicle and the position information on the rest facility information.

Then, the audio output section 115 controls an audio reproduction device such as the speaker installed in the vehicle so as to output the audio information (step ST84).

As described above, according to Embodiment 4, the in-vehicle device 1 is configured to include: the fatigue state estimation section 112 which estimates the fatigue state of the driver; and the rest facility requesting section 113 which sets the facility search condition for the facility with the attached parking lot in the case where it is judged, on the basis of the estimation result by the fatigue state estimation section 112, that the degree of fatigue of the driver is high, and which transmits, to the information distribution server 2, the acquisition request in combination with the position information in the position information acquisition section 121. Therefore, the in-vehicle device 1 can automatically acquire and present the facility information on the facility that is located around the vehicle and that enables taking the rest when the degree of fatigue of the driver is high, which can provide the facility information that meets a desire of the user which varies in accordance with the degree of fatigue.

Incidentally, in the above description, the in-vehicle device 1 transmits the acquisition request for the rest facility information separately from the regular acquisition request for the facility information, but it is not limited thereto; for example, the rest facility search condition may be transmitted with attached to the regular acquisition request for the facility information when the degree of fatigue of the driver is high.

In addition, according to Embodiment 4, the in-vehicle device 1 is configured to include: the audio information control section 114 which generates the audio information from the rest facility information acquired by the facility information acquisition section 101; and the audio output section 115 which outputs the audio information generated by the audio information control section 114. Consequently, the in-vehicle device 1 side can automatically search for the nearby rest facility 1 when the degree of fatigue of the driver is high, and propose to the driver the rest facility with the screen display and audio guidance of the in-vehicle device 1, which can prevent an accident in advance.

Further, if the information such as the parking lot use status in the facility information DB 202A is updated on the basis of the determination result by the parking state determination section 111, the available rest facility in the minimum time can be guided.

In addition, according to Embodiment 4, the audio information control section 114 is configured to select the information that represents the specialty or feature of the facility included in facility information to convert the selected information into the audio information. In this manner, when the specialty, feature, and so on of the rest facility are provided by the audio guidance, it is possible to act to make the driver interested in the rest facility.

In addition, according to Embodiment 4, it is configured that: the audio information control section 114 determines the direction of the rest facility with respect to the driver on the basis of the position information in the position information acquisition section 121 and the rest facility information acquired by the facility information acquisition section 101, and sets the corresponding direction as the audio source direction in which the audio information of the facility information is output; and that the audio output section 115 which can reproduce the stereophony outputs the audio information on the rest facility information from the audio source direction set by the audio information control section 114. In this manner, when the audio guidance is provided with directivity, the user can grasp intuitively what position on the screen to look at in the case where the facility information is acquired during travel.

Incidentally, in the above description, the configuration of Embodiment 4 is applied to the configuration shown in the above Embodiment 2, but it is not limited thereto; the configuration of Embodiment 4 may be applied to the configurations shown in the above Embodiments 1 and 3.

In addition, the facility information is audibly output when the driver is fatigued. However, the audio output may also be made in the case where the degree of fatigue is low, and it is not necessary to stick to the configuration of FIG. 17. For example, the in-vehicle device 1 may be configured to have only one of the function of acquiring the rest facility when the driver is fatigued (mainly the fatigue state estimation section 112 and the rest facility requesting section 113) and the function of audibly outputting facility information (mainly the audio information control section 114 and the audio output section 115).

The audio output section 115 performs audio guidance on the facility information acquired by the facility information acquisition section 101, which makes it easy for the user to grasp the facility information acquired during travel. Further, in the case where the facility is located outside the display screen, the user can change the scale of the map so that the facility information is displayed on the screen when the vehicle is at stopping. During travel, however, the change of the scale makes the map screen difficult to see, and therefore is not preferable. Thus, when the audio guidance is provided during travel, the facility information can be grasped without changing the scale of the map, and the latest facility information acquired from the information distribution server 2 can be presented to the user in real time.

Embodiment 5

In Embodiment 5, at starting of an in-vehicle device 1 or a first acquisition request for facility information, a negotiation process for a data format for the facility information, a communication condition, and so forth is configured to be performed with an information distribution server 2.

Figure 22:
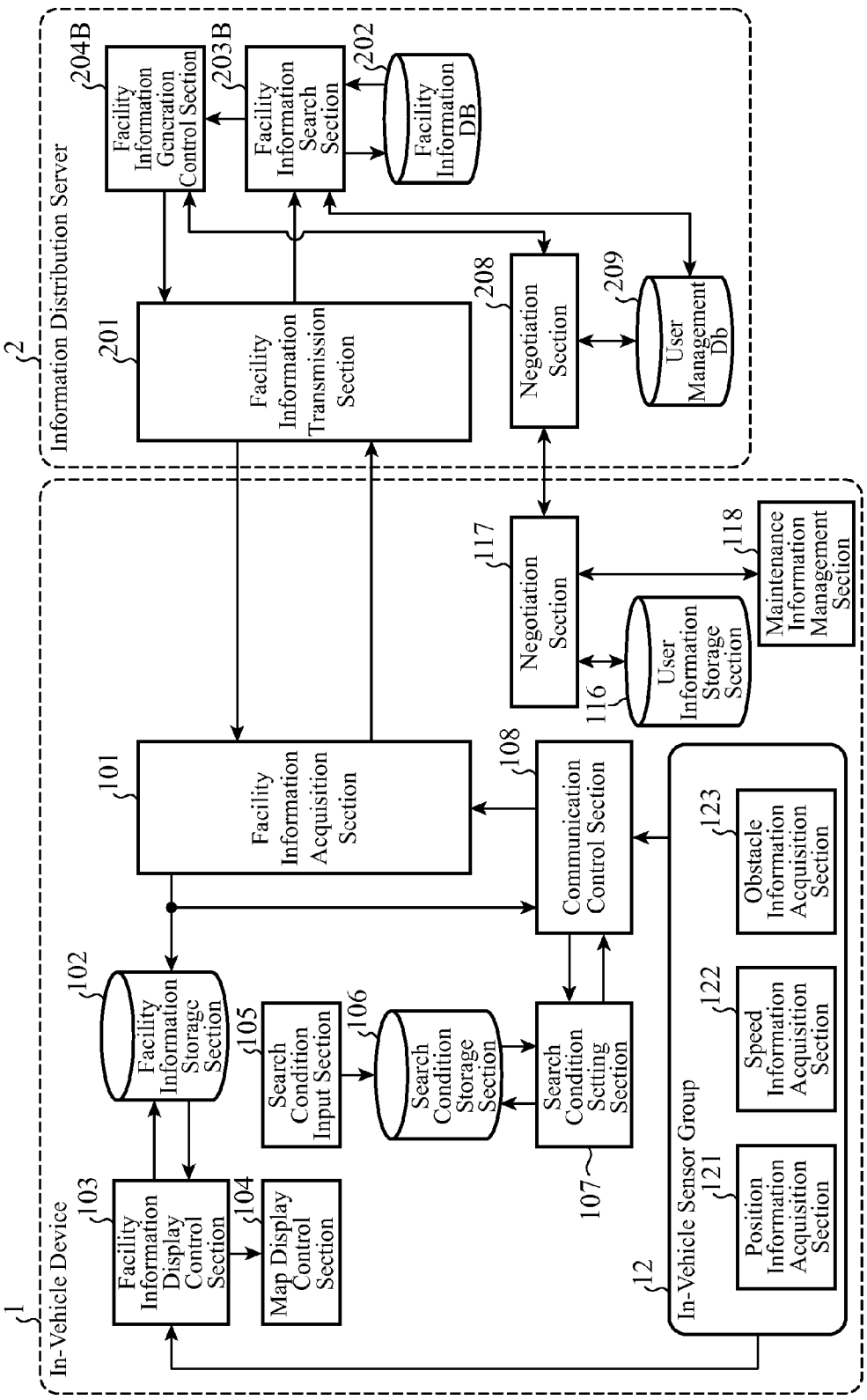
FIG. 22 is a block diagram illustrating a configuration of a navigation system according to Embodiment 5 of the present invention.

FIG. 22 illustrates a configuration of a navigation system according to Embodiment 5. Here, components for implementing the function of Embodiment 5 are added to the configuration of Embodiment 1.

The in-vehicle device 1 of Embodiment 5 further includes a user information storage section 116, a negotiation section 117, and a maintenance information management section 118.

In addition, the information distribution server 2 of Embodiment 5 further includes a negotiation section 208 and a user management DB 209. In addition, the facility information search section 203 and the facility information generation section 204 illustrated in FIG. 1 are functionally enhanced into a facility information search section 203B and a facility information generation control section 204B.

Note that in FIG. 22, the components that are the same as or equivalent to those in FIGS. 1 to 6 are denoted by the same reference numerals, and descriptions thereof will be omitted or simplified.

The user information storage section 116 stores, as information on a user who uses the in-vehicle device 1, user information such as the birthday and favorites of the user, product information on the in-vehicle device 1, and membership information registered in a certain facility.

The maintenance information management section 118 manages maintenance information about the maintenance period of the vehicle and the damage of the vehicle such as the vehicle model of the vehicle on which the in-vehicle device 1 is mounted, the vehicle inspection period, and the oil change indicator. The user information and maintenance information may be input in such a manner that the user operates the touch panel display of the in-vehicle device 1 and so on.

The negotiation section 117 presents, to the negotiation section 208 of the information distribution server 2, the information about specifications such as the size and the resolution of the display used in the in-vehicle device 1 and the information about communication such as communication speed and band when the in-vehicle device 1 is started, and collates the above information with information on specifications and communication of the information distribution server 2 presented by the negotiation section 208 to determine mutual communication conditions such as the data format, the data size, and the communication speed. In addition, at the same time, the negotiation section 117 notifies the negotiation section 208 of the information distribution server 2 of the user information stored in the user information storage section 116 and the maintenance information managed by the maintenance information management section 118 during negotiation.

On the other hand, as discussed above, the negotiation section 208 of the information distribution server 2 side presents the specifications information such as the data format for transmission to be used by the information distribution server 2 to the negotiation section 117 of the in-vehicle device 1, and collates the above information with the use information on the in-vehicle device 1 presented by the negotiation section 117 to determine the mutual communication conditions. In addition, the negotiation section 208 stores in the user management DB 209 the negotiation result and the user information and the maintenance information notified from the negotiation section 117. Thus, when the negotiation section 208 can use the negotiation result in the user management DB 209 from the next time, the next and subsequent negotiation processes can be omitted.

The user management DB 209 stores the negotiation result, user information, and maintenance information for each in-vehicle device 1.

The facility information search section 203B adds the user information acquired by the negotiation section 208 to the facility search condition received by the facility information transmission section 201 from the in-vehicle device 1, and extracts the facility information that matches the above conditions from the facility information DB 202. For example, in the case where the user information includes the birthday, the facility information search section 203B searches for the facility information on the facility that issues a coupon (a type of advertisement information) that can be used on the birthday.

In addition, the facility information search section 203B automatically extracts the facility information (hereinafter, repair facility information) on the facility that enables the maintenance, repair, and so forth from the facility information DB 202 when a regular maintenance period comes for an oil change and tire pressure adjustment for the vehicle on which the in-vehicle device 1 is mounted on the basis of the maintenance information stored in the user management DB 209.

The facility information generation control section 204B sorts the facility information extracted in accordance with the facility search condition, or the repair facility information extracted in accordance with the maintenance information from the facility information DB 202 by the facility information search section 203B, on the basis of the user information acquired by the negotiation section 208, and converts the information into the data format decided in the negotiation process.

Next, an operation of the navigation system according to Embodiment 5 will be described.

Figure 23:
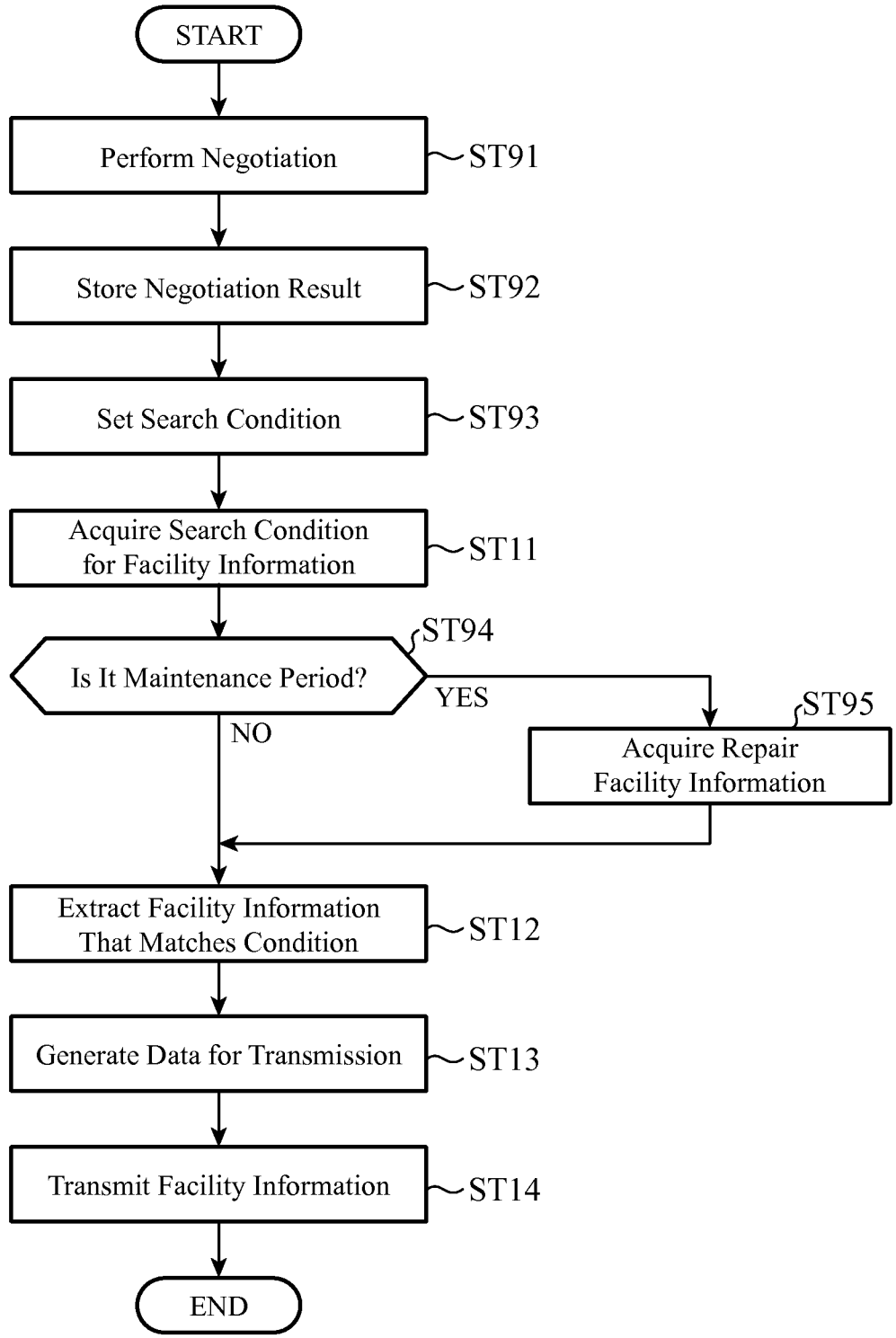
FIG. 23 is a flowchart illustrating a search and distribution process for facility information performed by an information distribution server according to Embodiment 5.

FIG. 23 is a flowchart illustrating a search and distribution process for the facility information performed by the information distribution server 2. Here, description is made when first communication time between the in-vehicle device 1 and the information distribution server 2 (therefore, the negotiation process is necessary) is assumed, and on the assumption that the specifications information required for the negotiation process has already been transmitted from the in-vehicle device 1 together with the facility search condition. Note that steps ST11 to ST14 of FIG. 23 are the same processes as steps ST11 to ST14 illustrated in FIG. 4, respectively, and therefore descriptions thereof will be omitted or simplified.

First, the negotiation section 208 acquires the specifications information, the user information, and the maintenance information transmitted from the negotiation section 117 of the in-vehicle device 1, and perform negotiation with the negotiation section 117 on the basis of the specifications information on the in-vehicle device 1 and the specifications information on the information distribution server 2 (step ST91). After that, the negotiation section 208 stores the negotiation result in the user management DB 209 together with the user information and the maintenance information (step ST92).

It is only necessary that steps ST91 and ST92 described above should be performed at the first communication time.

In addition, when searching for the facility information, the facility information search section 203B sets the search condition (e.g. birthday) on the basis of the user information (step ST93). In addition, the facility information generation section 204B sets a priority condition (e.g. user's favorite genre) on the basis of the user information.

Then, the facility information search section 203E acquires the facility search condition from the facility information transmission section 201 (step ST11).

The facility information search section 203B acquires the maintenance information stored in the user management DB 209, and judges whether or not it is the maintenance period of the vehicle on which the in-vehicle device 1 is mounted (step ST94). In the case where it is the maintenance period ("YES" in step ST94), the facility information search section 203B acquires the repair facility information on the facility that is located around the vehicle from the facility information DB 202 on the basis of the position information included in the facility search condition (step ST95).

Subsequently, the facility information search section 203B acquires from the facility information DB 202 the facility information that matches the search condition set on the basis of the user information and the facility search condition received from the in-vehicle device 1 (step ST12). The facility information generation control section 204B adds the repair facility information acquired in step ST95 to the facility information acquired in step ST12, and converts the resulting information into the data format for transmission (step ST13). The converted information is transmitted from the facility information transmission section 201 to the in-vehicle device 1 (step ST14).

On the other hand, in the case where it is not the maintenance period ("NO" in step ST94), the facility information search section 203B proceeds to step ST12, and searches for the facility information that matches the search condition set on the basis of the user information, and the facility search condition; the facility information generation control section 2043 converts the facility information into the data format for transmission (step ST13), and the converted information is transmitted from the facility information transmission section 201 to the in-vehicle device 1 (step ST14).

As described above, according to Embodiment 5, the negotiation section 117 is configured to transmit to the information distribution server 2 at least one of the pieces of information about the specifications and communication of the in-vehicle device 1 to perform negotiation with the information distribution server 2 when the first acquisition request is made, and to decide at least one of the data format and the communication condition for the facility information. Consequently, it is possible to minimize a setting by the user. In addition, when the data format etc. between the in-vehicle device 1 and the information distribution server 2 is determined, the information can be transmitted flexibly in accordance with the specifications and the situation as follows: for example, the image quality of the facility information to be transmitted to the in-vehicle device 1 with low performance is reduced, and a communication timing or communication frequency is reduced in the case where the communication is congested.

Incidentally, in the navigation system of FIG. 22, the information distribution server 2 is configured to judge the maintenance period of the vehicle on the basis of the maintenance information, but it is not limited thereto; the in-vehicle device 1 may be configured to judge the maintenance period and request the information distribution server 2 for the repair facility information. In this case, it is considered that when setting the facility search condition, for example, the search condition setting section 107 in FIG. 22 make reference to the maintenance information management section 118 to judge whether or not the maintenance period comes, and adds the condition for searching for the repair facility to the facility search condition in the case where it is judged that the maintenance is required. That is, the search condition setting section 107 also serves as a repair facility requesting section.

Consequently, the facility information on the facility that is located around the vehicle and that has repair equipment can be automatically provided when the vehicle on which the in-vehicle device 1 is mounted needs the repair or maintenance, which can provide the facility information on the facility that meets a desire of the user which varies in accordance with an external factor. In addition, when the repair facility information is displayed on the screen in combination with normal facility information, it is possible to propose the facility that provides a pastime during repair.

In addition, in the navigation system of FIG. 22, the facility information search section 203B is configured to make the search with the user information (including at least one of the pieces of information about the taste of the user and the in-vehicle device 1) managed by the user management DB 209 being added to the facility search condition in the information distribution server 2, but it is not limited thereto; the in-vehicle device 1 may be configured to set the facility search condition using the user information. In this case, it is considered that when setting a facility search condition, for example, the search condition setting section 107 in FIG. 22 makes reference to the user information storage section 116 to acquire the user information, and adds the information to the facility search condition.

Consequently, the user can save the setting of the facility search condition. In addition, when personal information such as the birthday is set as the user information, it is possible to receive the information that can be used in a particular event such as distribution of an exclusive birthday coupon (a type of advertisement information).

In addition, the manufacturer that manufactures the in-vehicle device 1 can provide a particular model with added value, which connects with sales promotion. Although this is not differentiation due to the function of the in-vehicle device 1 itself, the differentiation for each model can be achieved when the information that can be accessed for free by only the particular model at the initial stage or later as part of advertisement, for example, is stored in the information distribution server 2. This also benefits the user by saving replacement purchase and generation of an additional cost. As a result, an effect that connects with the sales promotion of the in-vehicle device 1 can be expected.

In addition, the facility side that provides the facility information to the in-vehicle device 1 via the information distribution server 2 can selectively distribute an exclusive coupon (the type of advertisement information) to the in-vehicle device 1 of a particular vehicle model on the basis of the vehicle model included in the user information, which enables, for example, distribution of advertisement information to a particular user layer.

Incidentally, in the aforementioned description, the configuration of Embodiment 5 is applied to the configuration shown in the above Embodiment 1, but it is not limited thereto; the configuration of Embodiment 5 may be applied to the configurations shown in the above Embodiments 2 to 4.

For example, in the above Embodiment 2, the presentation order priority condition is set in the in-vehicle device 1, and transmitted to the information distribution server 2. However, in the case where Embodiment 5 is applied thereto, the user information may be combined with the presentation order priority condition in the in-vehicle device 1, and the resulting information may be transmitted to the information distribution server 2.

Figure 24:
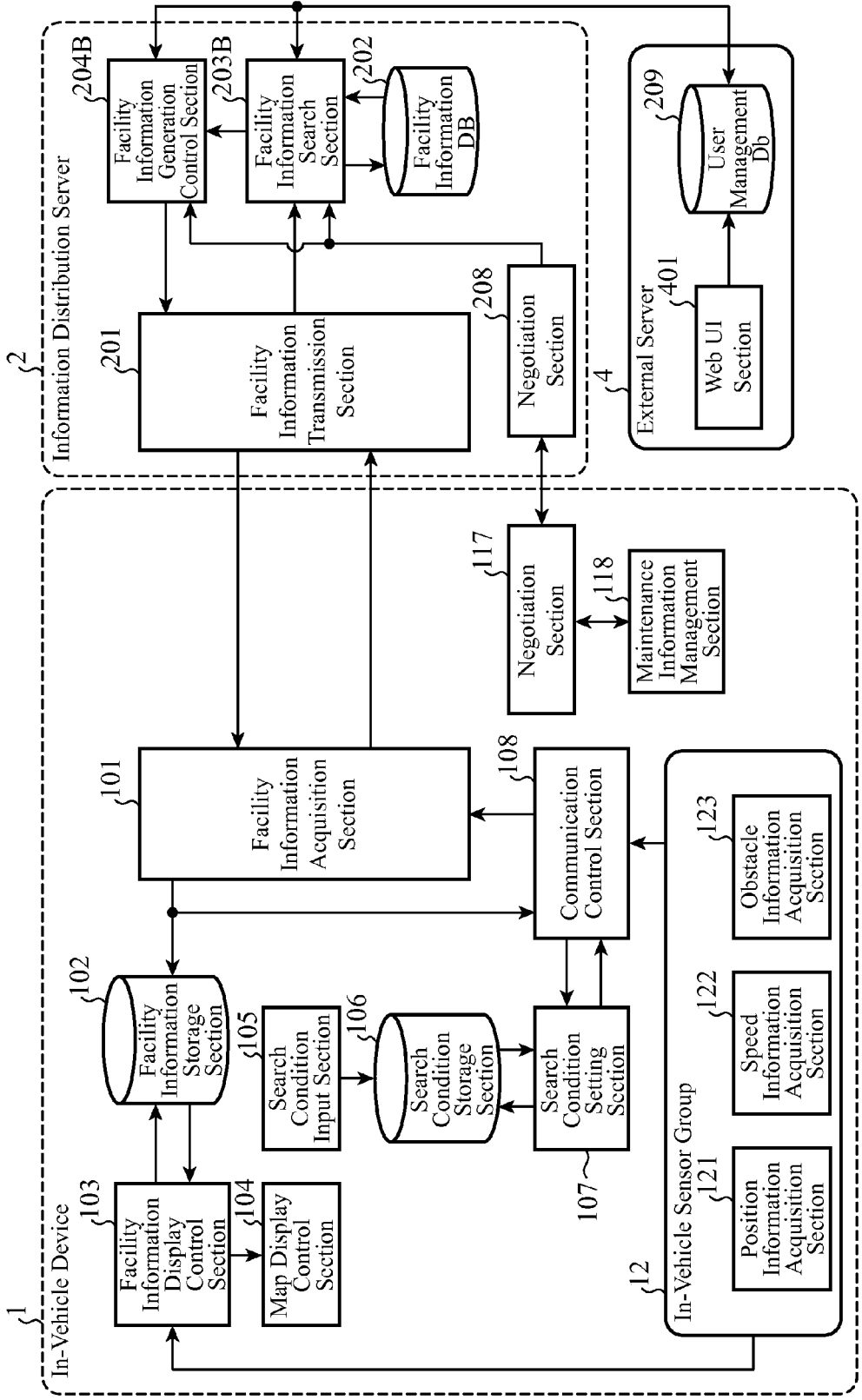
FIG. 24 is a block diagram illustrating a modification of the navigation system according to Embodiment 5.

In addition, in Embodiment 5, the information distribution server 2 is configured to include the user management DB 209 to manage user information, but it is not limited thereto; for example, as illustrated in FIG. 24, an external server 4 may be prepared separately from the information distribution server 2, and a Web page prepared by a Web UI section 401 of the external server 4 may be accessed from a terminal such as the in-vehicle device 1 or a personal computer or smartphone owned by the user to set the user information. Then, when sorting the facility information, the facility information generation control section 204B may access the external server 4 to acquire the user information stored in the user management DB 402.

As mentioned above, the information distribution server 2 may be notified of the user information to be used to sort the search result of the facility information by any method, and the notification method is not necessarily to stick to the above configuration.

Embodiment 6

In Embodiment 6, an in-vehicle device 1 is configured to be able to acquire facility information from an information distribution server 2 through an active operation by a user, and to change the display of a facility information UI displayed on a map screen.

Figure 25:
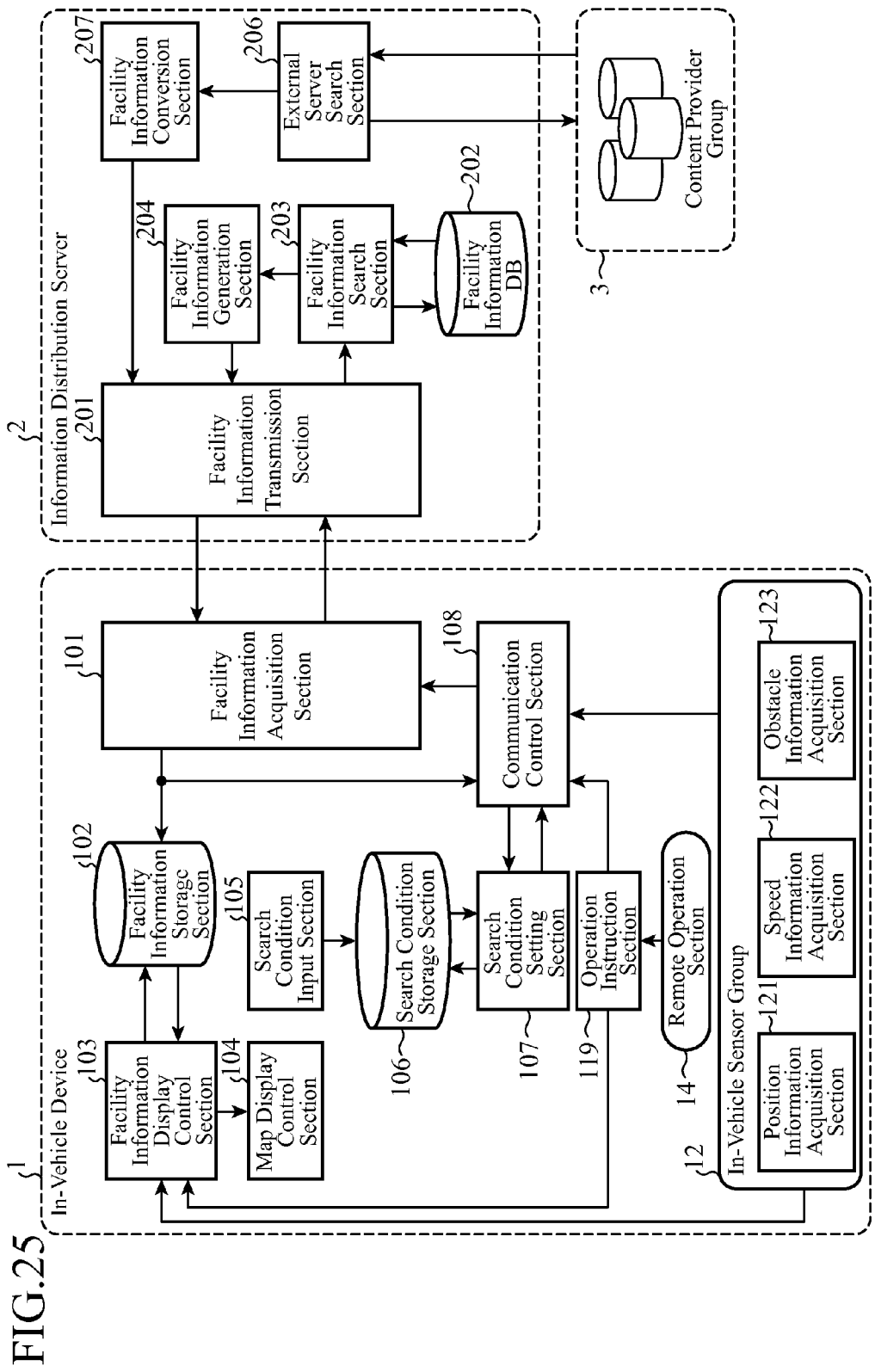
FIG. 25 is a block diagram illustrating a configuration of a navigation system according to Embodiment 6 of the present invention.

FIG. 25 illustrates a configuration of a navigation system according to Embodiment 6. Here, components for implementing the function of Embodiment 6 are added to the configuration of Embodiment 3.

The in-vehicle device 1 in Embodiment 6 further includes a remote operation section 14 and an operation instruction section 119.

Additionally, in FIG. 25, the components that are the same as or equivalent to those in FIGS. 14 to 16 are denoted by the same reference numerals, and descriptions thereof will be omitted or simplified.

The remote operation section 14 is an interface that receives the recognition result of a gesture operation or a speech operation performed by the user using an in-vehicle camera and a microphone provided in the vehicle on which the in-vehicle device 1 is mounted.

The operation instruction section 119 converts the recognition result of the user operation received by the remote operation section 14 into an operation instruction, and notifies a communication control section 108 and a facility information display control section 103 of the operation instruction. It is assumed that the operation instruction corresponding to the user operation has been set in advance in the operation instruction section 119.

For example, in the case where the user performs an operation of an acquisition request for the facility information on the remote operation section 14 at an arbitrary timing, the operation instruction section 119 converts the user operation into an operation instruction, and notifies the communication control section 108 of the operation instruction. The communication control section 108 having received this notification acquires a facility search condition from a search condition setting section 107, and acquires position information from a position information acquisition section 121, and the condition and information are transmitted from a facility information acquisition section 101 to an information distribution server 2.

In addition, for example, in the case where the user performs a switching operation between search services on the remote operation section 14 when a search for the facility information is made using the search service of a content provider group 3, the operation instruction section 119 converts the user operation into the operation instruction, and notifies the communication control section 108 of the operation instruction. The communication control section 108 having received this notification acquires the facility search condition from the search condition setting section 107, and acquires the position information from the position information acquisition section 121. The condition and information are transmitted from the facility information acquisition section 101 to the information distribution server 2 together with the operation instruction to the switching between the search services.

In addition, for example, in the case where the user performs an operation to change a display of a facility information UI on the remote operation section 14, the operation instruction section 119 converts the user operation into the operation instruction, and notifies the facility information display control section 103 of the operation instruction. The facility information display control section 103 having received this notification changes the display of the facility information UI displayed superimposedly on a map screen. For example, the facility information display control section 103 scrolls the facility information UI in accordance with the user operation, or displays the facility information UI in accordance with the user operation when the facility information UI is not displayed due to an obstacle located around the vehicle.

The operation instruction section 119 monitors the user operation performed on the remote operation section 14 at all times while the in-vehicle device 1 is during booting, and issues the aforementioned operation instruction.

Next, an operation of the navigation system according to Embodiment 6 will be described.

Figure 26:
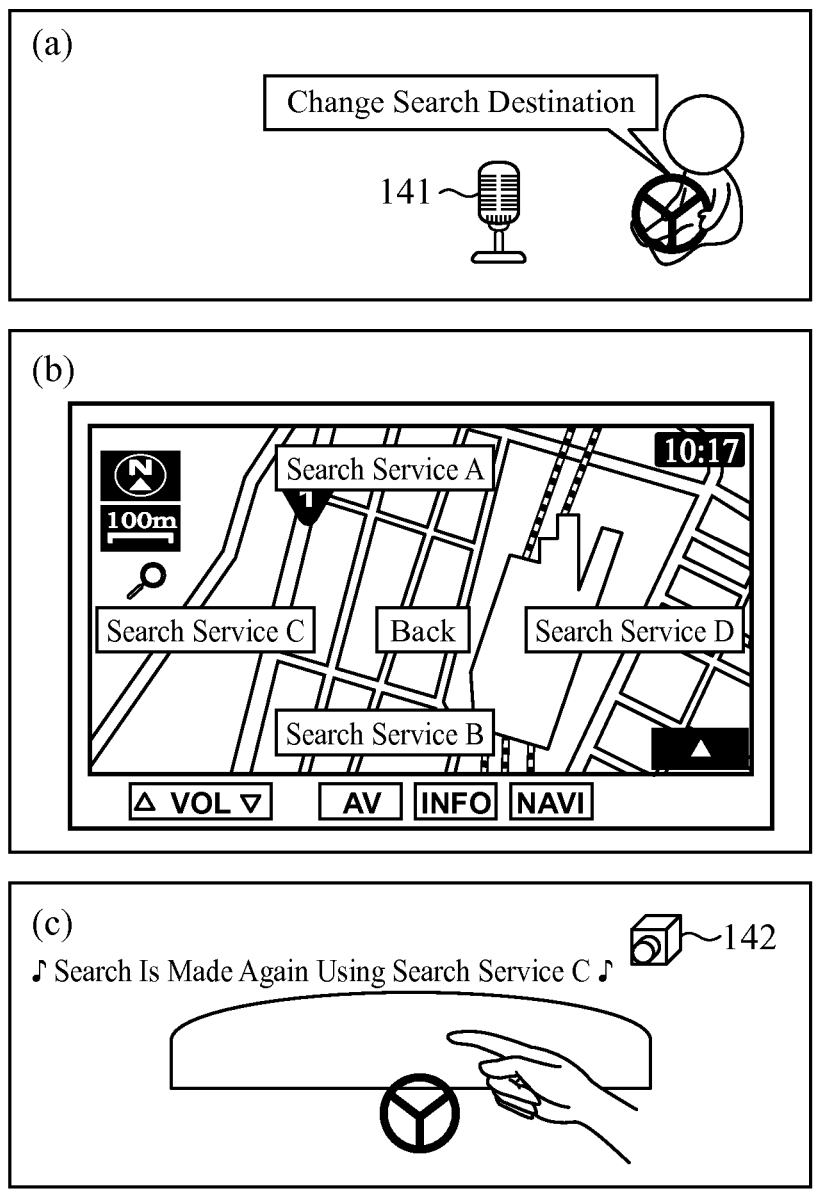
FIG. 26 illustrates a switching process for search services performed by an in-vehicle device according to Embodiment 6.
Figure 27:
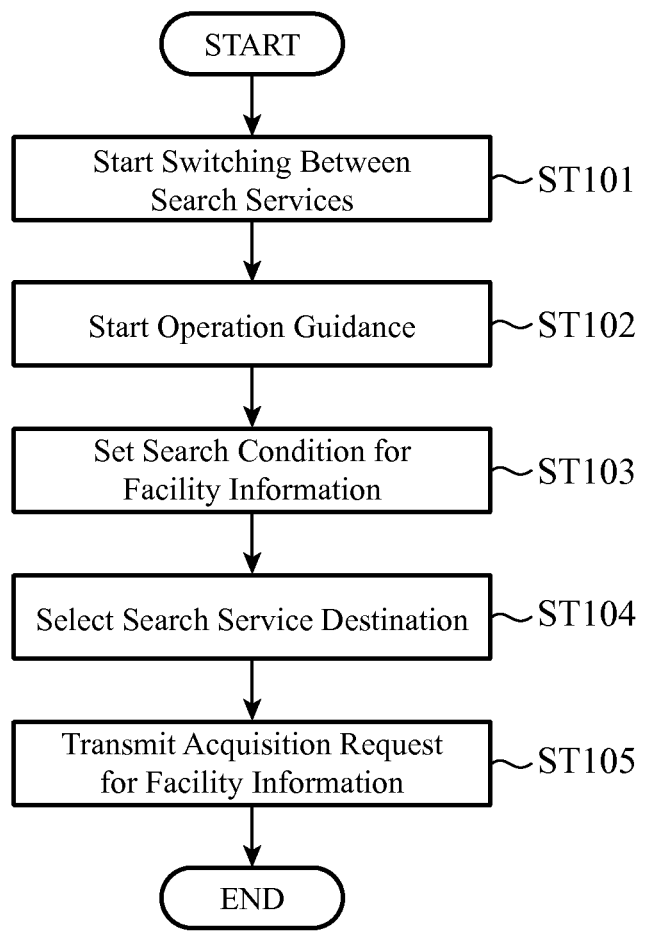
FIG. 27 is a flowchart illustrating the switching process for the search services performed by the in-vehicle device according to Embodiment 6.

Here, an example of the operation of the in-vehicle device 1 in response to a remote operation by the user is illustrated in FIG. 26. Here, an example in which the search service of the content provider group 3 is changed is described. FIG. 27 is a flowchart illustrating a switching process for the search services performed by the in-vehicle device 1.

First, as illustrated in FIG. 26(*a*), a speech of "Change search destination" by the user is picked up by an in-vehicle microphone 141 equipped in the remote operation section 14, and output to the operation instruction section 119 (step ST101). The operation instruction section 119 displays on the map screen switching guide UIs for search services A to D such as "Search service A", "Search service B", "Search service C", "Search service D", and "Back" illustrated in FIG. 26(*b*), and starts operation guidance (step ST102). In addition, the operation instruction section 119 instructs the search condition setting section 107 to set the facility search condition, and notifies the communication control section 108 of the facility search condition (step ST103).

When the user points his/her finger to the direction in which the search service that he/she desires to use is displayed as illustrated in FIG. 26(c) in accordance with the directions in which the switching guide UIs for "Search service A" to "Search service D" are displayed, the gesture operation is recognized by an in-vehicle camera 142 equipped in the remote operation section 14, and output to the operation instruction section 119. The operation instruction section 119 decides the search service destination in accordance with the output result, and notifies the search condition setting section 107 of the search service so that the facility search condition that designates the search service is set (step ST104). In the example, the finger of the user points to the direction in which the search service C is displayed, and thus, the operation instruction to switch to the search service C provided by the content provider group 3 is issued from the operation instruction section 119 to the search condition setting section 107. Finally, the communication control section 108 transmits the facility search condition including the designation of the search service from the facility information acquisition section 101 to the information distribution server 2, and makes the acquisition request for the facility information (step ST105).

Additionally, in the example of FIG. 26(a), the switching process for the search services is started by the speech; however, it may be started by operating a hardware button like a remote controller provided on a steering wheel. In addition, in FIG. 26(c), the selecting operation for the search services is performed by the finger pointing. However, the selection may also be made by a hand gesture, speech, or the like. Thus, the remote control method is merely exemplary, and is not limited to a particular operation method.

Figure 28:
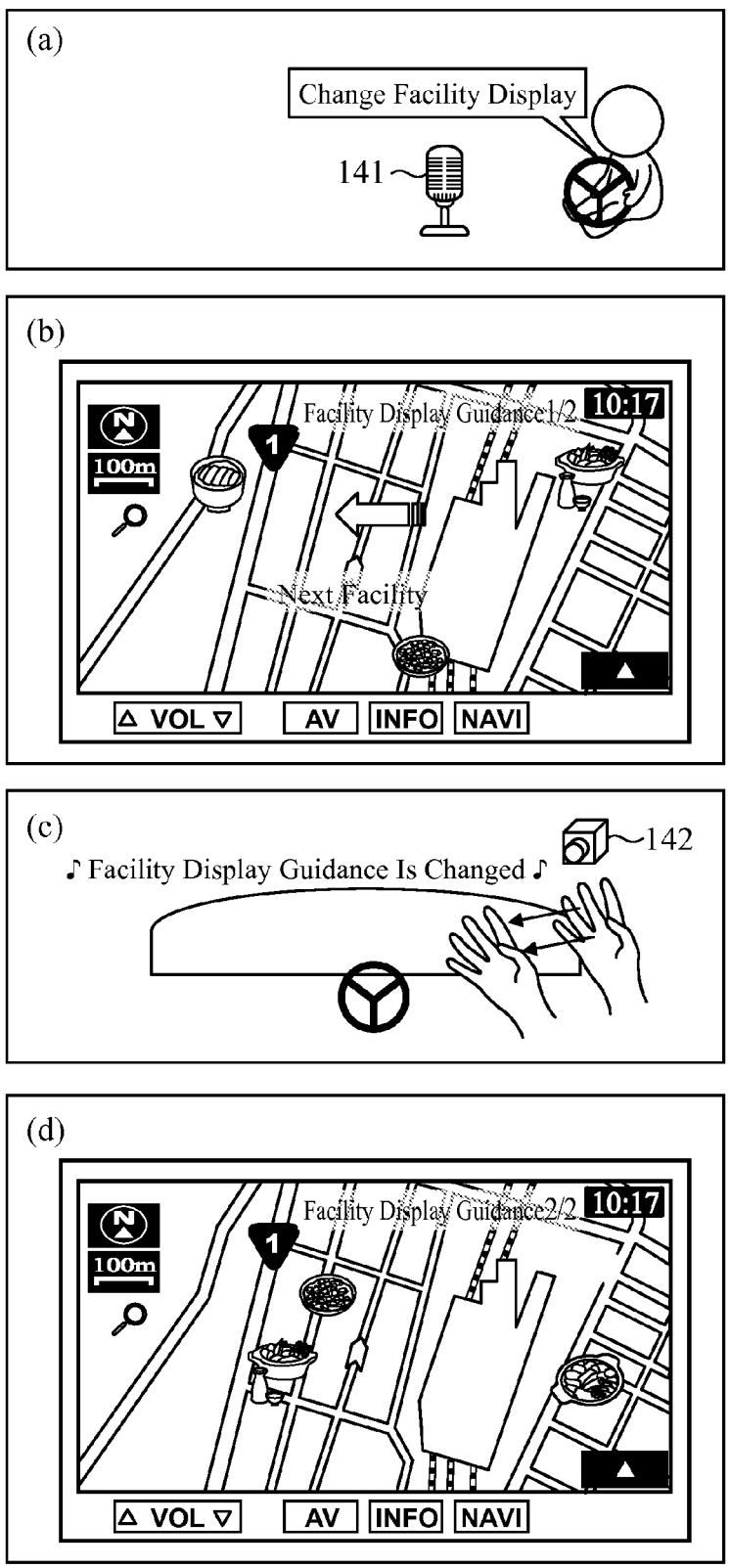
FIG. 28 illustrates a switching process for facility information UIs performed by the in-vehicle device according to Embodiment 6.
Figure 29:
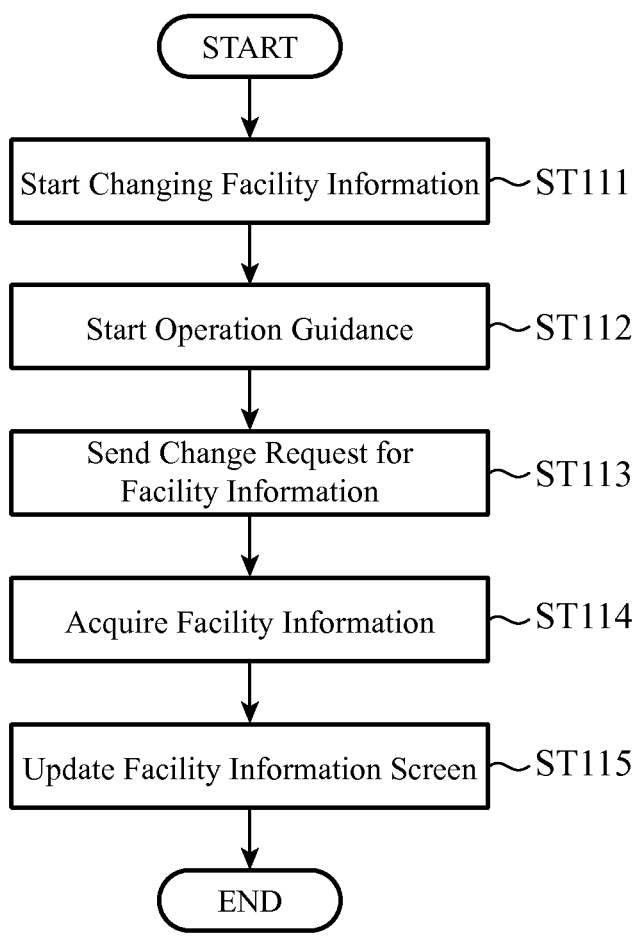
FIG. 29 is a flowchart illustrating the switching process for the facility information UIs performed by the in-vehicle device according to Embodiment 6.

Here, an example of the remote operation by the hand gesture is illustrated in FIG. 28. In the example of FIG. 28, when an obstacle is located around the vehicle, the facility information display control section 103 restricts the number of facilities to be displayed on the screen at a time, and therefore, from a relation in which facility information UIs extend over a plurality of pages, there is described an example such that the pages are turned to show the facility information UIs in accordance with the operation by the user. FIG. 29 is a flowchart illustrating the switching process for the facility information UIs performed by the in-vehicle device 1.

First, as illustrated in FIG. 28(a), the speech of "Change facility display" by the user is picked up by the in-vehicle microphone 141, and output to the operation instruction section 119 (step ST111). The operation instruction section 119 displays on the map screen an arrow and a facility display guide UI such as "Next facility" illustrated in FIG. 28(b), and starts operation guidance (step ST112).

When the user shakes his/her hand as illustrated in FIG. 28 (c) in accordance with the facility display guide UI, the gesture operation is recognized by the in-vehicle camera 142; the operation instruction section 119 converts the gesture operation into the operation instruction that requests the display change of the facility information UI, and notifies the facility information display control section 103 of the operation instruction (step ST113). The facility information display control section 103 having received the operation instruction acquires the facility information stored in the facility information storage section 102, prepares the facility information UI for the next page (step ST114), and updates the facility information UIs as shown in FIG. 28 (b) to FIG. 28(d) (step ST115).

Additionally, in the example of FIG. 28, the pages are configured to be turned to show the facility information UIs by the remote operation. However, the audio output of the facility information as described in the above Embodiment 4 may be configured to be fast-forwarded.

In addition, in order to inform the user that the in-vehicle device 1 has received the remote operation, the operation instruction section 119 may control the audio information control section 114 and the audio output section 115 in FIG. 17 so as to make the audio outputs such as "Search is made again using search service C" in FIG. 26(c) and "Facility display guidance is changed" in FIG. 28(c).

As described above, according to Embodiment 6, the in-vehicle device 1 is configured to include: the remote operation section 14 which receives the result of the speech recognition or gesture recognition of the remote operation performed by the user who is on the vehicle; and the operation instruction section 119 which provides guidance on the content of a choice-type remote operation that is executable by the user with one hand or through the speech and which converts the recognition result received by the remote operation section 14 into the operation instruction to control the in-vehicle device 1. For example, the operation instruction section 119 converts the recognition result in the remote operation section 14 into the operation instruction to control the search condition setting section 107 to thus control the switching between the facility search conditions, converts the recognition result in the remote operation section 14 into the operation instruction to control the communication control section 108 to thus control the timing when the facility information acquisition section 101 transmits the acquisition request, or converts the recognition result in the remote operation section 14 into the operation instruction to control the facility information display control section 103 to thus control the display of the facility information UI.

Consequently, the user can remotely operate the in-vehicle device 1 by a method that does not affect driving without operating a button or the like on the touch panel display of the in-vehicle device 1. In addition, regarding the guidance on the content of the remote operation, by displaying options on the screen so that a remote operation by the user is not erroneously detected, it is possible to make discrimination by a particular word when the audio input is made, and to make discrimination by directivity when the gesture is performed. Further, the operation can be performed even if the display of the in-vehicle device 1 does not have a touch panel function.

Figure 30:
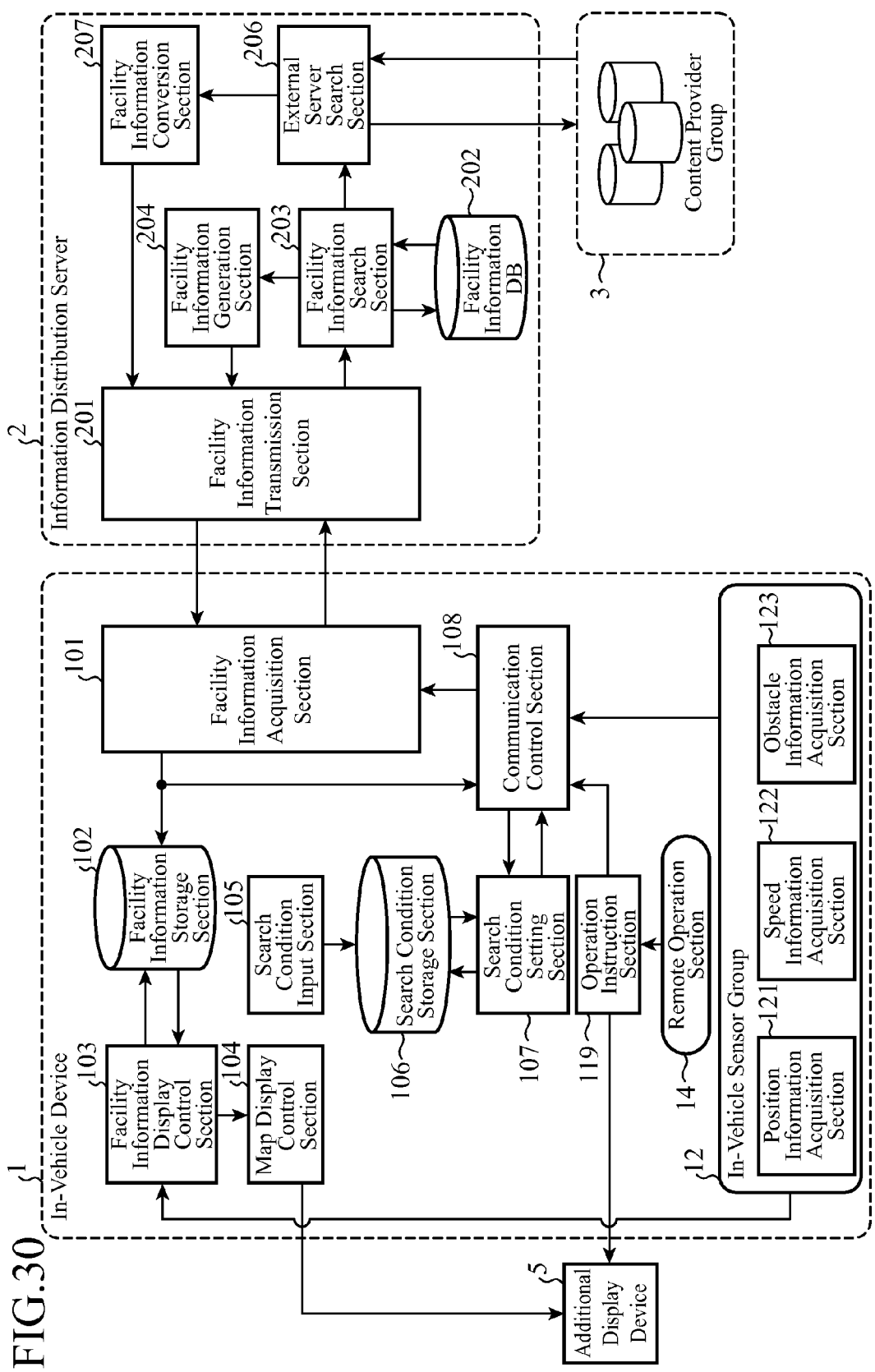
FIG. 30 is a block diagram illustrating a modification of the navigation system according to Embodiment 6.

Incidentally, in Embodiment 6, the display on the display of the in-vehicle device 1 is configured to be remotely operated, but it is not limited thereto; for example, as illustrated in FIG. 30, the in-vehicle device 1 may be configured to control the display on a separate additional display device 5 provided in the vehicle in the case where the additional display device 5 displays the map screen and facility information UI. Examples of the additional display device 5 include a HUD (Head-Up Display) provided in the vehicle.

Meanwhile, the in-vehicle device 1 may be constituted of a display device of a display audio or the like, and display control of the display device and communication control with the information distribution server 2 may be executed by a portable terminal such as a smartphone. Such an example is illustrated in FIG. 31.

Figure 31:
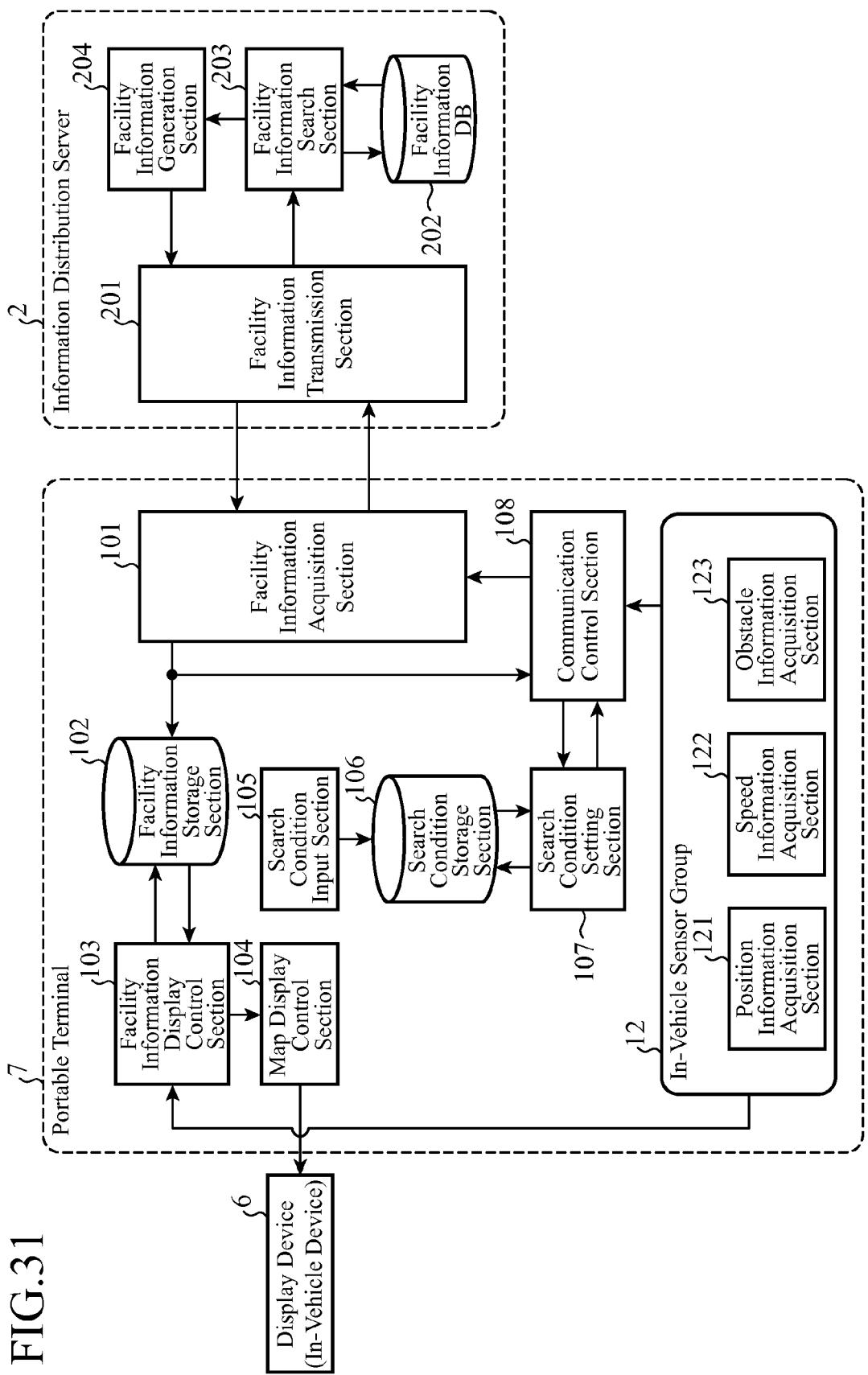
FIG. 31 is a block diagram illustrating a modification of the navigation system according to the present invention.

FIG. 31 illustrates a modification of the navigation system according to Embodiment 1. In the example, it is composed of a display device 6 mounted on the vehicle, a portable terminal (e.g. a smartphone) 7 brought into the vehicle, and an information distribution server 2 installed outside the vehicle. Note that in FIG. 31, the components that are the same as or equivalent to those in FIG. 1 are denoted by the same reference numerals, and detailed descriptions thereof will be omitted.

In the portable terminal 7, an in-vehicle sensor group 12 acquires, from a group of sensors mounted on the vehicle, information such as the position and speed of the vehicle and the presence or absence of an obstacle. Then, each time an acquisition request for facility information is sent to the information distribution server 2, a search condition setting section 107 acquires a facility search condition from a search condition storage section 106 which stores the facility search condition input by the user. Then, a facility information acquisition section 101 regularly transmits, to the information distribution server 2, an acquisition request combined with the position of the vehicle acquired by the in-vehicle sensor group 12 and the facility search condition acquired by the search condition setting section 107, and receives, from the information distribution server 2, the facility information on the facility located around the vehicle and matching the facility search condition. Then, a facility information display control section 103 turns the facility information received from the information distribution server 2 into facility information UIs, and controls the number of displays of the facility information UIs on the basis of the information in the in-vehicle sensor group 12. A map display control section 104 generates screen data for displaying the facility information UIs displayed superimposedly on the map screen, and outputs the screen data to the display device 6, so that the display device 6 displays the screen data. Alternatively, the screen data for the facility information UIs may be output from the facility information display control section 103 to the display device 6 so that the display device 6 displays superimposedly the screen data for the facility information UIs on the map screen.

Besides the aforementioned ones, the present invention may be subjected to a free combination of the embodiments, deformation of a desired component of each embodiment, or omission of a desired component of each embodiment within the scope of the invention.

INDUSTRIAL APPLICABILITY

As described above, since the in-vehicle device of the present invention is configured to control the number of displays of the facility information on the basis of the vehicle information, it is suitable for use in an in-vehicle device of a navigation system or the like that provides the facility information that meets a desire even during travel.

DESCRIPTION OF REFERENCE NUMERALS AND SIGNS

1: in-vehicle device
2: information distribution server
3: content provider group
4: external server
5: additional display device
6: display device (display section)
7: portable terminal
12: in-vehicle sensor group
13: additional sensor group
14: remote operation section
101: facility information acquisition section
102: facility information storage section
103: facility information display control section
104: map display control section
105: search condition input section
106: search condition storage section
107: search condition setting section
108: communication control section
109: use history storage section
110: priority condition setting section
111: parking state determination section
112: fatigue state estimation section
113: rest facility requesting section
114: audio information control section
115: audio output section
116: user information storage section
117: negotiation section
118: maintenance information management section
119: operation instruction section
121: position information acquisition section
122: speed information acquisition section
123: obstacle information acquisition section
131: user-on-board information acquisition section
132: weather information acquisition section
133: parking information acquisition section
141: in-vehicle microphone
142: in-vehicle camera
201: facility information transmission section
202, 202A: facility information DB
203, 203E: facility information search section
203A: facility information priority search section
204: facility information generation section
204A, 204B: facility information generation control section
205: facility information updating section
206: external server search section
207: facility information conversion section
208: negotiation section
209: user management DB
401: Web UI section
402: user management DB.

The invention claimed is:

1. An in-vehicle device that displays facility information on a facility on a map, the device comprising:
a processor and a memory storing instructions which, when executed, causes the processor to perform a process including:
acquiring information on at least one of a speed of a vehicle and presence or absence of an obstacle around the vehicle in addition to a position of the vehicle;
storing a facility search condition input by a user;
obtaining the facility search condition each time an acquisition request for the facility information is sent to an information distribution server that holds the facility information; and
regularly transmitting to the information distribution server, the acquisition request combined with the position of the vehicle and the facility search condition, and receiving, from the information distribution server, the facility information on the facility located around the vehicle, which matches the facility search condition;
a facility information display controller that controls the number of displays of the facility information on a basis of the information acquired in the acquiring step when the facility information received in the receiving step is displayed on the map;
a communication controller that controls a frequency at which the acquisition request is transmitted on a basis of the information acquired in the acquiring step;
an audio information controller that preferentially selects information representing a specialty or feature of a facility included in the facility information received in the receiving step and generates audio information;
an audio output processor that outputs the audio information generated by the audio information controller; and
a fatigue state estimator that estimates a fatigue state of a driver;
wherein when the fatigue state estimator determines that a degree of fatigue of the driver is high, the audio information controller causes the audio output processor to output the audio information including the specialty or the feature of the facility in such a manner that the driver having a high degree of fatigue develops an interest in the facility.

2. The in-vehicle device according to claim 1, wherein said acquiring acquires the information about the user getting in the vehicle about a weather around the vehicle, and about the facility set as a destination; the process performed by the processor and memory further comprising:
setting at least one information of the pieces of information acquired in said acquiring as a priority condition
the facility information display controller controls a display order of the facility information received from the information distribution server in said obtaining on the basis of the priority condition.

3. The in-vehicle device according to claim 1, wherein said acquiring acquires the information that indicates a state of at least one of an engine and a parking brake of the vehicle; the process performed by the processor and memory further comprising:
determining whether or not the vehicle is in a parking state in a parking lot attached to the facility on the basis of the information acquired by the parking information acquirer, and
transmitting the determination result to the information distribution server to cause the information distribution server to update a parking lot use status of the facility included in the facility information held by the information distribution server.

4. The in-vehicle device according to claim 3, wherein said acquiring acquires the number of users getting in the vehicle, the process performed by the processor and memory further comprising:
determining the number of users on board acquired by said acquiring together with the determination result of the parking to cause the information distribution server to update a use status of the facility included in the facility information held by the information distribution server.

5. The in-vehicle device according to claim 1, wherein said obtaining adds to the facility search condition a condition that designates a content provider group capable of communicating via the information distribution server, and causes the information distribution server to search the facility information held by the content provider group.

6. The in-vehicle device according to claim 1, wherein the process performed by the processor and memory further comprises:
transmitting, to the information distribution server, at least one of the pieces of information about specifications and communication of the in-vehicle device to perform negotiation with the information distribution server at the time of a first acquisition request, and that decides at least one of a data format and a communication condition for the facility information.

7. The in-vehicle device according to claim 1, wherein the process performed by the processor and memory further comprises:
managing at least one of the pieces of information about a degree of damage and maintenance of the vehicle;
said acquiring, in the case where it is judged that the repair or maintenance of the vehicle is needed on the basis of the information managed by the maintenance information manager, setting the facility having repair equipment for the facility search condition, and transmitting, to the information distribution server, the acquisition request combined with the position of the vehicle acquired by the vehicle information acquirer and the facility search condition.

8. The in-vehicle device according to claim 1, wherein
the audio information controller determines, on the basis of the position of the vehicle and the position of the facility included in the facility information, a direction of the facility from the driver, and sets the direction as an audio source direction from which the audio information on the facility information is output; and
the audio output processor is capable of reproducing stereophony, and outputs the audio information on the facility information from the audio source direction set by the audio information controller.

9. The in-vehicle device according to claim 1, further comprising:
a user information storage that stores at least one of the pieces of information about a taste of the user getting in the vehicle and about the in-vehicle device, wherein said obtaining adds the information stored in the user information storage to the facility search condition.

10. The in-vehicle device according to claim 1, further comprising:
a remote operation processor that receives a result of a speech recognition or a gesture recognition of a remote operation performed by the user getting in the vehicle;
wherein the process performed by the processor and memory includes providing guidance on a content of a choice-type remote operation that is executable by the user with one hand or speech, and converting the recognition result received by the remote operation processor into an operation instruction to control the in-vehicle device.

11. A facility information display method of displaying a map and facility information on a facility on a display, the method comprising:
acquiring information on at least one of a speed of a vehicle and presence or absence of an obstacle around the vehicle in addition to a position of the vehicle;
obtaining, from a search condition storage that stores a facility search condition input by a user, the facility search condition each time an acquisition request for the facility information is sent to an information distribution server that holds the facility information;
regularly transmitting, to the information distribution server, the acquisition request combined with the position of the vehicle acquired in the acquiring step and the facility search condition obtained in the obtaining step, and receiving, from the information distribution server, the facility information on the facility located around the vehicle, which matches the facility search condition;
controlling the number of displays of the facility information received in the receiving step on a basis of the information acquired in the acquiring step, and displaying the facility information on the map of the display;
controlling a frequency at which the acqusion request is transmitted on a basis of the information acquired in the acquiring step;

preferentially selecting information representing a specialty or feature of a facility included in the facility information received in the receiving step and generating audio information;
outputting the audio information generated by the audio information controller; and
estimating a fatigue state of a driver;
wherein, in the fatigue state estimating step, when it is determined that a degree of fatigue of the driver is high, the audio information including the specialty or the feature of the facility is outputted in the audio output step in such a manner that the driver having a high degree of fatigue develops an interest in the facility.

* * * * *